(12) United States Patent
Ohzuku et al.

(10) Patent No.: US 7,722,989 B2
(45) Date of Patent: May 25, 2010

(54) NON-AQUEOUS ELECTROLYTE SECONDARY BATTERY WITH A POSITIVE ACTIVE MATERIAL COMPRISING PRIMARY PARTICLES AND SECONDARY PARTICLES MADE OF THE PRIMARY PARTICLES

(75) Inventors: Tsutomu Ohzuku, Katsuragi (JP); Hiroshi Yoshizawa, Hirakata (JP); Kensuke Nakura, Hirakata (JP)

(73) Assignees: Panasonic Corporation, Osaka (JP); Osaka City University, Osaka (JP)

( * ) Notice: Subject to any disclaimer, the term of this patent is extended or adjusted under 35 U.S.C. 154(b) by 459 days.

(21) Appl. No.: 10/979,764

(22) Filed: Nov. 3, 2004

(65) Prior Publication Data

US 2005/0147889 A1  Jul. 7, 2005

(30) Foreign Application Priority Data

Nov. 7, 2003  (JP) ............................. 2003-377954

(51) Int. Cl.
*H01M 4/52* (2006.01)
(52) U.S. Cl. ................................... 429/223; 429/231.3
(58) Field of Classification Search ................. 429/223, 429/231.3
See application file for complete search history.

(56) References Cited

U.S. PATENT DOCUMENTS

| 5,264,201 | A | * | 11/1993 | Dahn et al. ............. 252/519.1 |
| 5,626,635 | A | | 5/1997 | Yamaura et al. |
| 5,677,087 | A | | 10/1997 | Amine et al. |
| 5,783,333 | A | * | 7/1998 | Mayer ............................. 429/223 |
| 5,981,106 | A | | 11/1999 | Amine et al. |
| 6,007,947 | A | * | 12/1999 | Mayer ............................. 429/231.1 |
| 6,045,771 | A | | 4/2000 | Matsubara et al. |
| 6,168,887 | B1 | | 1/2001 | Dahn et al. |
| 6,277,521 | B1 | * | 8/2001 | Gao et al. ............... 429/231.1 |
| 6,291,107 | B1 | | 9/2001 | Shimizu |

(Continued)

FOREIGN PATENT DOCUMENTS

EP     0 989 622 A1     3/2000

(Continued)

OTHER PUBLICATIONS

T. Ohzuku, et al. "Electrochemistry and Structural Chemistry of $LiNiO_2$ (R3m) for 4 Volt Secondary Lithium Cells" The Electrochemical Society, Inc., J. Electrochem. Soc., vol. 140, No. 7, Jul. 1993, pp. 1862-1870.

(Continued)

*Primary Examiner*—Mark Ruthkosky
(74) *Attorney, Agent, or Firm*—McDermott Will & Emery LLP

(57) ABSTRACT

As an alternative technique to lead-acid batteries, the present invention provides an inexpensive 2 V non-aqueous electrolyte secondary battery having excellent cycle life at a high rate by preventing volume change during charge and discharge. The non-aqueous electrolyte secondary battery uses: a positive electrode active material having a layered structure, being represented by chemical formula $Li_{1\pm\alpha}[Me]O_2$, where $0 \leq \alpha < 0.2$, and Me is a transition metal including Ni and at least one selected from the group consisting of Mn, Fe, Co, Ti and Cu, and including elemental nickel and elemental cobalt in substantially the same ratio; and a negative electrode active material including $Li_4Ti_5O_{12}(Li[Li_{1/3}Ti_{5/3}]O_4)$.

32 Claims, 15 Drawing Sheets

U.S. PATENT DOCUMENTS

| | | | |
|---|---|---|---|
| 6,352,794 B1 | 3/2002 | Nakanishi et al. | |
| 6,379,842 B1 * | 4/2002 | Mayer | 429/231.3 |
| 6,436,577 B1 | 8/2002 | Kida et al. | |
| 6,551,744 B1 | 4/2003 | Ohzuku et al. | |
| 6,582,854 B1 | 6/2003 | Qi et al. | |
| 6,749,648 B1 * | 6/2004 | Kumar et al. | 29/623.1 |
| 6,753,111 B2 | 6/2004 | Kweon et al. | |
| 6,773,852 B2 | 8/2004 | Cho et al. | |
| 6,808,848 B2 | 10/2004 | Nakanishi et al. | |
| 7,078,128 B2 | 7/2006 | Lu et al. | |
| 2002/0009645 A1 | 1/2002 | Shima et al. | |
| 2002/0197532 A1 | 12/2002 | Thackeray et al. | |
| 2003/0054251 A1 | 3/2003 | Ohzuku et al. | |
| 2003/0082448 A1 | 5/2003 | Cho et al. | |
| 2003/0082452 A1 | 5/2003 | Ueda et al. | |
| 2003/0087154 A1 | 5/2003 | Ohzuku et al. | |
| 2003/0129496 A1 | 7/2003 | Kasai et al. | |
| 2003/0170540 A1 | 9/2003 | Ohzuku et al. | |
| 2004/0058243 A1 | 3/2004 | Ohzuku et al. | |
| 2004/0110063 A1 | 6/2004 | Uchitomi et al. | |
| 2004/0126660 A1 | 7/2004 | Ohzuku et al. | |
| 2005/0027156 A1 | 2/2005 | Pulido | |
| 2005/0064282 A1 * | 3/2005 | Inagaki et al. | 429/163 |
| 2005/0079416 A1 | 4/2005 | Ohzuku et al. | |
| 2005/0260496 A1 | 11/2005 | Ueda et al. | |
| 2006/0099508 A1 | 5/2006 | Thackeray et al. | |
| 2006/0204847 A1 | 9/2006 | Ohzuku et al. | |
| 2007/0009424 A1 | 1/2007 | Ohzuku et al. | |

FOREIGN PATENT DOCUMENTS

| | | |
|---|---|---|
| EP | 1 295 851 A1 | 3/2003 |
| EP | 1 309 022 A2 | 5/2003 |
| JP | 3244314 | 10/1991 |
| JP | 05-283076 | 10/1993 |
| JP | 08-171910 A | 12/1994 |
| JP | 7-320784 | 12/1995 |
| JP | 7-335261 | 12/1995 |
| JP | 08-138670 A | 5/1996 |
| JP | 08-217452 | 8/1996 |
| JP | 8-298115 | 11/1996 |
| JP | 09-055210 | 2/1997 |
| JP | 9-129230 | 5/1997 |
| JP | 9-171824 | 6/1997 |
| JP | 10-3921 | 1/1998 |
| JP | 10-27609 | 1/1998 |
| JP | 10-27626 | 1/1998 |
| JP | 10-69922 | 3/1998 |
| JP | 10-199525 | 7/1998 |
| JP | 10-208744 | 8/1998 |
| JP | 10-316431 A | 12/1998 |
| JP | 11-025980 | 1/1999 |
| JP | 11-060246 A | 3/1999 |
| JP | 11-167919 | 6/1999 |
| JP | 11-1323 | 7/1999 |
| JP | 11-310416 | 9/1999 |
| JP | 11-292547 | 10/1999 |
| JP | 11-339802 | 12/1999 |
| JP | 2000-082466 | 3/2000 |
| JP | 2000-133262 | 5/2000 |
| JP | 2000-149923 | 5/2000 |
| JP | 2000-251892 | 9/2000 |
| JP | 2000-340230 | 12/2000 |
| JP | 2001-085006 | 3/2001 |
| JP | 2001-185153 | 7/2001 |
| JP | 2001-192210 | 7/2001 |
| JP | 2001-210324 | 8/2001 |
| JP | 2001-243952 | 9/2001 |
| JP | 2001-332261 | 11/2001 |
| JP | 2002-42813 | 2/2002 |
| JP | 2002-100358 | 5/2002 |
| JP | 2002-145623 | 5/2002 |
| JP | 2002-158011 | 5/2002 |
| JP | 2002-338250 | 11/2002 |
| JP | 2003-059490 | 2/2003 |
| JP | 2003-137555 | 5/2003 |
| JP | 2003-203633 | 7/2003 |
| JP | 2003-221236 | 8/2003 |
| JP | 2003-238165 | 9/2003 |
| JP | 2004-002141 | 1/2004 |
| KR | 2002-0019221 | 3/2002 |
| KR | 2000-0017619 | 3/2003 |
| WO | WO 98/57386 A1 | 7/1996 |
| WO | WO 01/99215 A1 | 12/2001 |
| WO | WO 02/40404 | 5/2002 |

OTHER PUBLICATIONS

T. Ohzuku "Synthesis and Characterization of $LiAl_xNi_xO_2$ (R3m) for Lithium-Ion (Shuttlecock) Batteries" The Electrochemical Society, Inc., J. Electrochem. Soc., vol. 142, No. 12, Dec. 1995, pp. 4033-4039.

Lu, Z. et al., Layered Cathode Materials $Li[Ni_xLi_{(1/3-2x/3)}Mn_{(2/3-x/3)}]O_2$ for Lithium-Ion Batteries, Electrochemical and Solids-Sate Letters, 2001, p. A191-A194, vol. 4, The Electrochemical Society, Inc.

Lu, Z. et al., "Layered $Li[Ni_xCo_{1-2x}Mn_x]O_2$ Cathode Materials for Lithium-Ion Batteries," Electrochemical and Solid-State Letters, p. A200-A203, vol. 12, The Electrochemical Society, Inc.

Terada, Y. et al., "In Situ XAFS Analysis of Li(Mn, M)$_2$ O$_4$(M=Cr, Co, Ni) 5V Cathode Materials for Lithium-Ion Secondary Batteries," Journal of Solid Sate Chemistry, Feb. 2001, p. 286-291, vol. 156 Issue 2, Academic Press.

Park, H. et al., "Relationship between Chemical Bonding Character and Electrochemical Performance in Nickel-Substituted Lithium Manganese Oxides," J. Phys. Chem., May 3, 2001, p. 4860-4866, vol. 105, American Chemical Society.

Lu et al., "Superlattice Ordering of Mn, Ni, and Co in Layered Alkali Transition Metal Oxides with P2, P3, and O3 Structures," Chem. Mater., p. 3583-3590, vol. 12, American Chemical Society.

Abraham, et al., "Surface changes on $LiNi_{0.8}Co_{0.2}O_2$ particles during testing of high power lithium-ion cells," Electrochemistry Communications, May 2002, p. 620-625, vol. 4, Elsevier.

West et al., "Introduction for Solid-State Chemistry," Kodansha-Scientific, Mar. 20, 1996, with partial translation.

Yoshio et al., "Lithium-ion Secondary Battery," Nikkan Kogyo Shinbunsha, Mar. 29, 1996, with partial translation.

Saka, K, "Study of Crystal Electron Microscope," Uchida Rokakuho, Nov. 25, 1997, with partial translation.

Japanese Society of Microscopy, Kanto Division, "Technique of Electron microscope technique for advanced material evaluation," Asakura-shoten, Dec. 15, 1991, with partial translation.

Kato, M., "Analysis of X-ray diffraction," Uchida Rokakuho, Apr. 20, 1990, with partial translation.

Neudecker, B.J. et al., "Lithium Manganese Nickel Oxides $Li_x(Mn_yNi_{1-y})_{2-x}O_2$," J. Electrochem. Soc., Dec. 1998, p. 4148-1459, vol. 145, No. 12, The Electrochemical Society, Inc.

Yoshio, M. et al., "Preparation and properties of $LiCo_yMn_xNi_{1-x-y})_2$ as a chathode for lithium ion batteries," Journal of Power Sources, Aug. 17, 1998, p. 176-181, vol. 90, Elsevier.

Cho, T. et al., "Preparation of Layered $Li[Ni_{1/3}Mn_{1/3}Co_{1/3}]O_2$ as a Cathode for Lithium Secondary Battery by Carbonate Coprecipitation Method," Chemistry Letters, Feb. 24, 2004, p. 704-705, vol. 33 No. 6, The Chemical Society of Japan, Japan.

Ohzuku, T. et al., "Why transition metal (di) oxides are the most attractive materials for batteries," Solid State Ionics, Aug. 1994, p. 202-211, vol. 69 No. 3,4, North-Holland, The Netherlands.

Ohzuku, T. et al.,"New Route to Prepare $LiNiO_2$ For 4-Volts Secondary Lithium Cells," Chemistry Express, vol. 7, No. 9, pp. 689-692, 1992, Kinki Chemical Society, Japan.

Ohzuku, T. et al., "Synthesis and Characterization of $LiNiO_2$ (R3m) for Rechargeable Nonaqueous Cells," Chemistry Express, vol. 6, No. 3, Mar. 1991, pp. 161-164, Kinki Chemical Society, Japan.

Ohzuku, T. et al., "Solid State Electrochemistry of Intercalation Compound of LiAl$_{1/2}$Ni$_{1/2}$O$_2$(R3m) for Lithium-Ion Batteries," Electrochemistry of Intercalation, (1998), p. 1209-1214, vol. No. 12, The Electrochemical Society of Japan, Japan.

Ohzuku, T. et al., "Comparative Study of LiCoO$_2$, LiNi$_{1/2}$Co$_{1/2}$O$_2$ And LiNiO$_2$ For 4 Volt Secondary Lithium Cells," The Journal of The International Society Of Electrochemistry, Jun. 1993, p. 1159-1167, vol. 38 No. 9, Pergamon Press.

Dahn J.R. et al., "Layered Li[NixCo1-2xMnx]02 Cathode Materials for Lithium-Ion Batteries," Electrochemical and Solid-State Letters, The Electrochemical Society, 2001, 4(12), A200-A203.

Rossen E., et al., "Structure and electrochemistry of Li$_x$Mn$_y$Ni$_{1-y}$O$_2$", Solid State Ionics, 1992, pp. 311-318, vol. 57, Elsevier Science Publishers B.V..

* cited by examiner 1. 1-substituted imidazoli 2. 2-substituted imidazolium 3. 3-substituted imidazolium 4. Pyridinium 5. Phosphonium 6. Ammonium 7. Pyrrolidinium 8. Guanidinium 9. Isouronium 1. Halogen Cl⁻ , Br⁻ , 2. Sulfate and Sulfonate 3. Amide and Imide 4. Methane

[HC(SO$_2$CF$_3$)$_2$]⁻ ,

5. Borate

BF$_4$⁻ , B(CN)$_4$⁻ ,

6. Phosphate and Antimonate

7. Others (decanate and cobalt tetracarbonyl)

C$_{10}$H$_{21}$COO⁻ , Co(CO)$_4$⁻ ,

NON-AQUEOUS ELECTROLYTE SECONDARY BATTERY WITH A POSITIVE ACTIVE MATERIAL COMPRISING PRIMARY PARTICLES AND SECONDARY PARTICLES MADE OF THE PRIMARY PARTICLES

BACKGROUND OF THE INVENTION

Lead-acid batteries are used as starters for automobiles. Lead-acid batteries are also widely used as backup power supplies for industrial and commercial devices. Currently, there is a growing move to replace lead-acid batteries used as backup power supplies with nickel-metal hydride batteries or lithium ion batteries, which mainly originates from demands for smaller power supplies by replacing lead-acid batteries with batteries having a high energy density and demands for environmentally friendly batteries by removing batteries using lead in order to reduce environmental burdens.

As for lead-acid batteries used for automobiles, there is no such move. In order to reduce environmental burdens, however, it is desirable to replace lead-acid batteries with environmentally friendly batteries. Considering the application in automobiles, it is also desirable to replace nickel-metal hydride batteries with lighter and superior lithium ion batteries. In view of the above, the replacement of lead-acid batteries currently used in the fields of automobiles and backup power supplies with lithium ion batteries will certainly be necessary in the future.

Lithium ion batteries utilized as the main power supplies for mobile communication devices and portable electronic devices are characterized by having a high electromotive force and a high energy density. The positive electrode active materials for lithium ion batteries include lithium cobaltate ($LiCOO_2$), lithium nickelate ($LiNiO_2$), manganese spinel ($LiMn_2O_4$) and the mixtures thereof. These positive electrode active materials have a voltage of not less than 4 V relative to that of lithium.

As the negative electrodes therefor, carbon materials are typically used. The combination of the above-described positive electrode and the negative electrode made of carbon forms a 4 V level lithium ion battery. Desirable alternatives to lead-acid batteries are lithium ion batteries having a voltage equal to that of lead-acid batteries and lithium ion batteries having a voltage in multiples of 6 when a plurality of them are connected in series. From this point of view, 4 V level lithium ion batteries are not suitable for that purpose. As an alternative to lead-acid batteries, lithium ion batteries having a voltage of 2 or 3 V are suitable. Although there are various methods for reducing voltage, the prior art examples particularly dealing with the system that employs a titanium oxide in the negative electrode will be described below because the present invention is characterized by using a titanium oxide in the negative electrode.

Japanese Laid-Open Patent Publication No. Hei 07-320784 discloses a non-aqueous electrolyte lithium ion battery including a negative electrode containing a lithium-titanium oxide with a spinel-type structure ($Li_{4/3}Ti_{5/3}O_4$) as a negative electrode active material and a positive electrode containing $Li_2MnO_3$ or $LiMnO_2$ as a positive electrode active material, and a non-aqueous electrolyte. The disclosed battery, however, has an actual discharge voltage of around 1.6 V, which is quite low for a 2 V battery.

Japanese Laid-Open Patent Publication No. Hei 10-027609 discloses a non-aqueous electrolyte secondary battery employing a lithium-titanium oxide with a spinel-type structure as a negative electrode active material and an active material containing a lithium-manganese oxide ($Li_{4/3}Mn_{5/3}O_4$) with a spinel structure in a positive electrode. This battery system has a voltage of around 2.5 V, which could be a preferred voltage, but it is slightly high for a 2 V level battery. This prior art example, however, does not fundamentally solve the problem of deterioration during storage and a low cycle life caused by dissolving of Mn from the spinel-type lithium-manganese oxide.

Japanese Laid-Open Patent Publication No. Hei 07-335261 discloses a battery using a lithium cobaltate ($LiCoO_2$) as a positive electrode active material and a lithium titanate ($Li_{4/3}Ti_{5/3}O_4$) as a negative electrode active material. This battery system has a preferred voltage, but increased cost is inevitable since a large amount of Co metal is used. Additionally, problems are expected to occur in terms of long-term reliability because $LiCoO_2$ repeatedly expands and contracts in volume during charge and discharge, which facilitates the destruction of crystal lattice as will be described later.

Japanese Laid-Open Patent Publication No. Hei 10-027626 discloses a lithium secondary battery using, as a positive electrode active material, a lithium transition metal oxide represented by $LiA_xB_{1-x}O_2$, where A and B are metal elements selected from Co, Ni, Mn, Fe, V, Al and Ti, and a lithium-titanium oxide represented by $Li_{4/3}Ti_{5/3}O_4$ as a negative electrode active material, wherein the actual capacity ratio of the lithium titanium oxide to the lithium transition metal oxide is not greater than 0.5. The invention disclosed in this patent publication pertains to a battery design focusing primarily on the capacity balance of positive and negative electrodes, and the necessity of the combinations that make full use of the characteristics of each material as will be described later is not mentioned.

Japanese Laid-Open Patent Publication No. Hei 10-069922 discloses a battery system using a titanium ion-deficient type lithium titanium oxide $Li_{4/3}Ti_{5/3}O_4$ having a spinel structure, in a negative electrode, wherein at least one of carbon, graphite, $WO_2$, $Fe_2O_3$, $LiFe_5O_8$, $SiO_2$ and SnO is added. This invention is intended to improve the resistance against overcharge and overdischarge, which differs from the present invention in terms of constituent and purpose.

Japanese Laid-Open Patent Publication No. 2001-210324 discloses, as a positive electrode active material, a lithium manganese composite oxide represented by $Li_{1+x}M_yMn_{2-x-y}O_{4-z}$, where M is one or more of Ti, V, Cr, Fe, Co, Ni, Zn, Cu, W, Mg and Al, $0 \leq x \leq 0.2$, $0 \leq y < 0.5$ and $0 \leq z < 0.2$, wherein the half width of the (400) diffraction peak obtained by powder X-ray diffraction using CuKα radiation is not less than 0.02 θ and not greater than 0.1 θ (θ is an angle of diffraction), and the primary particles thereof has an octahedron shape. This patent publication proposes a battery comprising a positive electrode containing the above-described positive electrode active material and a negative electrode containing, as a negative electrode active material, a lithium titanium composite oxide represented by $Li_aTi_bO_4$, where $0.5 \leq a \leq 3$ and $1 \leq b \leq 2.5$. This battery system has a discharge voltage of not less than 3 V, which differs from the voltage of the battery of the present invention.

Japanese Laid-Open Patent Publication No. 2001-243952 discloses, as a positive electrode active material, a lithium nickel composite oxide represented by $Li_{1-x}A_xNi_{1-y}M_yO_2$, where A is one or more selected from alkaline metals except Li and alkaline-earth metals; M is one or more selected from Co, Mn, Al, Cr, Fe, V, Ti and Ga; $0 \leq x \leq 0.2$; and $0.05 \leq y \leq 0.5$, wherein the primary particles with an average particle size of not less than 0.5 μm aggregate to form secondary particles. This patent publication also discloses a battery including a positive electrode containing the above-described positive electrode active material and a negative electrode containing, as a negative electrode active material, a lithium titanium composite oxide represented by $Li_aTi_bO_4$, where $0.5 \leq a \leq 3$ and $1 \leq b \leq 2.5$. The object of this disclosed invention is to provide an inexpensive lithium secondary battery having good cycle characteristics particularly during high temperature storage and good high temperature storage characteristics.

For that purpose, the invention of this patent publication focuses on the following two points. Firstly, it is disclosed that the primary particles of the positive electrode active material are required to have an average particle size of not less than 0.5 μm in the invention of the patent publication. The conception thereof is based on inherently unavoidable volume change. There is described in the specification that the primary particles are nearly identical to monocrystals and they expand and contract due to the absorption and desorption of lithium during the repetition of charge and discharge, which is interpreted that the volume change cannot be avoided. In order to minimize the volume change, it is proposed to increase the particle size of the primary particles.

As for the selection of the transition metal, although the patent publication teaches to add Co, Mn, Al or the like to prevent the phase transition of the crystal structure from a hexagonal system into an monoclinic phase, it was known at the time the invention was made and was not a special technique. The patent publication further teaches that the addition of Al prevents the decomposition reaction of the active material accompanied by the release of oxygen and improves thermal stability and electron conductivity, but this was also known at the time the invention was made. For example, J. Electrochem. Soc., 140, 1862 (1993) by T. Ohzuku et al. and Japanese Laid-Open Patent Publication No. Hei 09-171824 teach to prevent the phase transition of a crystal by partly replacing Ni of $LiNiO_2$ with Co. J. Electrochem. Soc., 142, 4033 (1995) by T. Ohzuku et al. and Japanese Laid-Open Patent Publication No. Hei 10-208744 teach to improve thermal stability by adding Al.

Secondly, Japanese Laid-Open Patent Publication No. 2001-243952 proposes the use of a lithium titanium oxide represented by $Li_aTi_bO_4$ ($0.5 \leq a \leq 3$ and $1 \leq b \leq 2.5$) as a negative electrode active material. It is disclosed that this prevents the decomposition of a non-aqueous electrolyte and the deposition of a reaction product onto the surface of a negative electrode accompanied by the decomposition, which improves the cycle life, because the reduction potential of the lithium titanium oxide is 1.5 V relative to that of $Li/Li^+$, higher than that of a typically used carbonaceous material. The fact that the lithium titanium oxide has a high potential has already been explicitly disclosed in the aforementioned prior art examples of titanium oxides, and it is not something new that the above-mentioned invention offers.

Finally, Japanese Laid-Open Patent Publication No. 2001-243952 is totally silent on the point that the combination according to the patent publication produces a new effect. It only discloses the individual effect of the positive and negative electrodes and merely lists the combinations of effects, which are easily conceivable from prior arts. Moreover, it discloses a core material for negative electrode made of copper as shown in EXAMPLE, a separator made of thin microporous film, and an electrolyte including currently widely used solvent and solute. All of them are known materials and used in currently commercially available lithium secondary batteries. Additionally, it does not at all teach that a new effect is produced by specifically selecting them.

In recent years, demand is getting stronger, particularly for improved high rate and pulse characteristics. Charging/discharging at a high rate results in a higher load to a material so that the prior arts have failed to improve the factors for structural damage, etc. It is also getting difficult to maintain the current level of cycle life. Moreover, the use of lithium cobaltates or graphite materials having a layered structure is accompanied by problems, particularly short cycle life at a high rate charge/discharge caused by leakage of an electrolyte from between electrodes or by material stress caused by the repetition of expansion and contraction of lithium cobaltates or graphite materials in the layer direction during charge and discharge. Accordingly, to inhibit the expansion and contraction is a crucial factor for achieving a longer cycle life in such battery systems.

In view of the foregoing, an object of the present invention is to provide a battery system that can theoretically almost completely eliminate the expansion and contraction in volume during charge and discharge. In this regard, not only the combination of positive and negative electrode active materials but also the combination of positive and negative electrodes is important.

As described above, in the fields of automobiles and backup power supplies where lead-acid batteries are currently used, the replacement of lead-acid batteries with lithium ion batteries will be necessary in the future.

Given the above, the present invention also provides a battery system that can provide an appropriate voltage for those applications. Thereby, a reduction in size and weight can be achieved. The term "appropriate voltage" used herein means a discharge voltage of 2 V, the same as that of conventional lead-acid batteries. As the power supply for idle stop of automobile, the battery is desired to be maintained in, for example, a 60 to 70% charged condition. This is suitable for charge control during regenerative charging. In order to make such control easier, it is important that the battery voltage should be changed relatively linearly in this range.

An object of the present invention is to provide a battery system which exhibits a flat discharge voltage during discharge, specifically, in the range where the battery capacity is not greater than 50% to provide a constant voltage of 2 V and also exhibits a linearly increasing voltage during charge in the range where the battery capacity is not less than 60% so as to make the charge control easier, which will be described later in EXAMPLE. There is no proposal from such viewpoint in the prior arts.

In the present invention, an extensive study was also made on electrolytes. The solvents unable to be used due to reductive decomposition in the case of using a conventional carbonaceous material include solvents having high oxidation resistance and those having a high flash point. The present invention discloses that these solvents are used yet the safety and reliability of the battery can be improved remarkably. Particularly, a great effect can be expected from the use of an ionic liquid. The inclusion thereof extremely reduces the possibilities of combustion and smoke in the battery because ionic liquids do not have a vapor pressure.

As for the separator, currently used microporous films made of olefin such as polyethylene and polypropylene can be used. These separators, however, are costly.

Since a battery is the combination of positive and negative electrodes, the balance of the capacity of positive and negative electrodes largely affects the performance of the battery, particularly, cycle life and long-term reliability. The present invention also examines the know-how regarding the capacity design and proposes a preferred range.

The current collector of the negative electrode is typically made of copper, but copper has a high specific gravity and poor weight efficiency. Besides, the use of copper is accompanied by the problems that it dissolves when the potential exceeds 3 V relative to that of lithium metal during deep discharge and that lithium ions are deposited in the form of a dendrite as a metal lithium during overcharge, which significantly impairs the safety. Despite the above problems, copper metal have been used because the negative electrode requires a carbonaceous material.

In the present invention, aluminum or an aluminum alloy can be used for the negative electrode core material to achieve weight reduction. It is also possible to prevent the battery safety from being significantly impaired during overcharge because aluminum absorbs lithium to prevent lithium from being deposited.

SUMMARY OF THE INVENTION

The present invention provides a non-aqueous electrolyte secondary battery including:

a negative electrode comprising a titanium oxide as a negative electrode active material; and a positive electrode comprising a positive electrode active material having a layered structure and being represented by the chemical formula $Li_{1\pm\alpha}[Me]O_2$, where $0 \leq \alpha < 0.2$, and Me is a transition metal including Ni and at least one selected from the group consisting of Mn, Fe, Co, Ti and Cu, the battery having a designed charge/discharge range of not greater than 2.8 V.

Here, the "designed charge/discharge range" is a usable charge/discharge range, which is determined by the design (constitution) of the battery, for example, a combination of materials for positive electrode and negative electrode, other electrode materials such as conductive material and, further, conditions for charge/discharge such as temperature and current. Among them, the "designed charge/discharge range" is determined mainly by the combination of materials for positive electrode and negative electrode. In other wards, the "designed charge/discharge range" is called a recommended charge/discharge range to be used.

The volume expansion/contraction ratio calculated from the crystal lattice constants of the positive electrode active material and the negative electrode active material in the designed charge/discharge range is preferably not greater than 2%.

The positive electrode active material preferably contains elemental nickel and elemental cobalt in substantially the same ratio.

The positive electrode active material preferably contains at least one of $Li_{1\pm x}Ni_{1/2}Co_{1/2}O_2$ ($x \leq 0.1$) and $Li_{1\pm x}Ni_{1/3}Co_{1/3}Mn_{1/3}O_2$ ($x \leq 0.1$).

The error of the ratio between the elemental nickel and the elemental cobalt is preferably within 10 atom %.

The positive electrode active material preferably contains, as an additional element, at least one selected from the group consisting of Al, Mg, Sr, Ca, Y and Yb.

The titanium oxide preferably has a spinel structure.

The titanium oxide is preferably $Li_4Ti_5O_{12}$.

The non-aqueous electrolyte secondary battery preferably contains at least one selected from the group consisting of ethylene carbonate, propylene carbonate, γ-butyrolactone, γ-valerolactone, methyldiglyme, sulfolane, trimethyl phosphate, triethyl phosphate, methoxy ethyl methyl carbonate and fluorinated ethylene carbonate as a solvent.

The non-aqueous electrolyte secondary battery preferably contains at least one ionic liquid.

The cation in the ionic liquid is preferably selected from the group consisting of imidazolium, pyridinium, phosphonium, ammonium, pyrrolidinium, guanidinium and isouronium.

The anion in the ionic liquid is preferably selected from the group consisting of halogen, sulfate, sulfonate, amide, imide, methane, borate, phosphate, antimonate, decanate and cobalt tetracarbonyl.

The non-aqueous electrolyte secondary battery in accordance with the present invention preferably includes a separator made of non-woven fabric. The non-woven fabric is preferably made of at least one selected from the group consisting of polyethylene, polypropylene, vinylon, nylon, polyethylene terephthalate, aramid resin and polybutylene terephthalate.

The ratio of the capacity of the negative electrode active material to that of the positive electrode active material is preferably not less than 0.5 and less than 1.2.

Each of the positive electrode and the negative electrode preferably includes a current collector made of aluminum or an aluminum alloy.

The positive electrode active material preferably contains crystalline particles having a particle size of 0.1 to 8 μm and secondary particles having a particle size of 2 to 30 μm made of said crystalline particles.

Furthermore, the negative electrode active material contains secondary particles having an average particle size of not greater than 10 μm, the secondary particles being made of aggregated primary particles having an average particle size of not greater than 0.6 μm.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
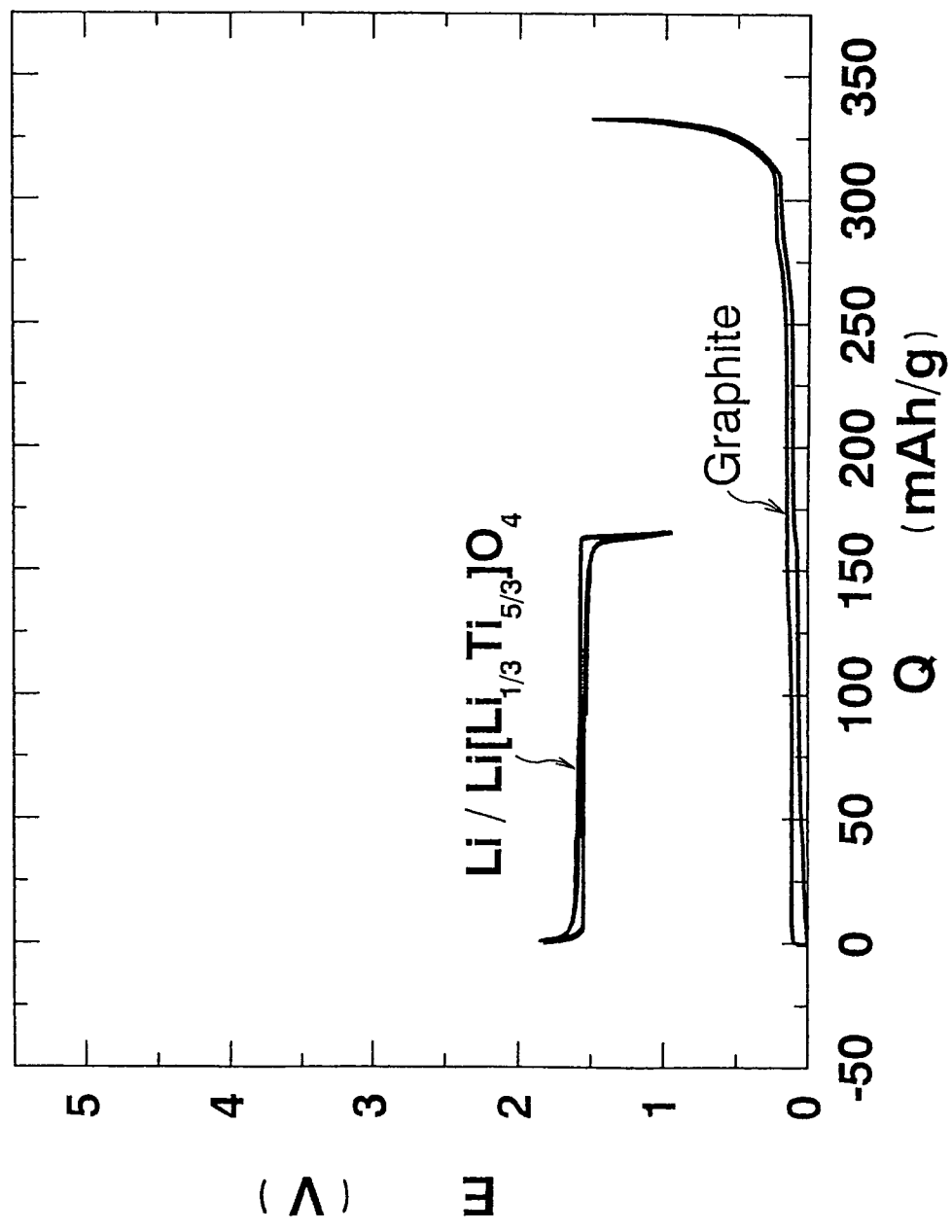
FIG. 1 is a graph showing the charge/discharge behavior of a negative electrode of a lithium titanium oxide.

(1) Synthesis of Active Material in Invention

As the titanium oxide having a spinel structure used as the negative electrode active material, $Li_4Ti_5O_{12}$ is preferred because it is already used in commercially available batteries and high-quality $Li_4Ti_5O_{12}$ can be purchased. Alternatively, the titanium oxide can be easily synthesized by mixing a titanium oxide as the titanium source with a lithium compound such as lithium carbonate or lithium hydroxide at a specified composition, which is then baked at a temperature of about 800 to 1100° C. in an atmosphere or oxygen current flow.

Now, the synthesis of the positive electrode active material is described. $Li_{1\pm\alpha}[Me]O_2$ (where $0 \leq a < 0.2$, and Me is a transition metal containing Ni and at least one selected from the group consisting of Mn, Fe, Co, Ti and Cu) can be synthesized by mixing an oxide, a hydroxide and/or a carbonate, which contain elements that constitute a desired positive electrode active material, at a specified composition, followed by baking. This synthesis, however, involves advanced particle technology because each material should have the same particle size and thorough mixing is necessary to provide a homogeneous reaction.

In the present invention, a positive electrode active material may be synthesized by coprecipitating transition metals such as nickel, cobalt and manganese in an aqueous solution as a hydroxide or carbonate. This synthesis is relatively easy because nickel and manganese, which are unlikely to be dispersed, are uniformly dispersed within a particle. In the synthesis in EXAMPLE which will be described later, a eutectic hydroxide is used. As the lithium source, lithium hydroxide is used. These materials are thoroughly mixed and then baked. A mixture prepared by thoroughly mixing these materials can be formed into pellets before baking in order to ensure reaction.

Here, a description is given of the value "α". The value "α" is a variable factor for controlling the growth of the particles. If the value "α" is smaller than 1 which is the stoichiometry composition, the growth of the particles during synthesis will be inhibited, and the surface area tends to be increased. Conversely, if the value "α" is greater than 1, the growth of the particles will be accelerated. Accordingly, the design of the particles can be controlled by changing the composition ratio of lithium although the particles are usually designed according to the characteristics required for the battery. The allowable range of the value "α" is substantially about ±0.2. If the range is grater than that, the inherent function of the active material will be damaged.

In the case of carrying out an exemplary electrochemical measurement for the positive electrode active material, a cell for electrochemical measurement was produced as follows. Specifically, a mixture containing 80 parts by weight of the positive electrode active material, 10 parts by weight of acetylene black as a conductive material and 10 parts by weight of PVDF (polyvinylidene fluoride) as a binder was diluted with NMP (N-methyl-2-pyrrolidone). The obtained mixture was applied onto a current collector made of aluminum foil, which was then dried in a vacuum at 60° C. for 30 minutes and cut into pieces of 15×20 mm². The piece was further dried in a vacuum at 150° C. for 14 hours to give an electrode. The electrode had a thickness of 120 to 190 μm. The counter electrode was produced by attaching a lithium metal sheet on a stainless steel plate. The separator was a porous film made of polyethylene. The electrolyte was prepared by dissolving 1.0 M of $LiPF_6$ in a solvent mixture of EC (ethylene carbonate) and DMC (dimethyl carbonate) at a volume ratio of 3:7. The obtained unit cell was repeatedly charged and discharged at a current density of 0.17 mA/cm² within a given voltage.

(2) Volume Change of Electrodes in Battery of Invention

The inhibition of expansion and contraction of the positive and negative electrodes during charge and discharge is a crucial factor for achieving a longer cycle life. An object of the present invention is to provide a battery system that can theoretically almost completely eliminate the expansion and contraction during charge and discharge.

Figure 2:
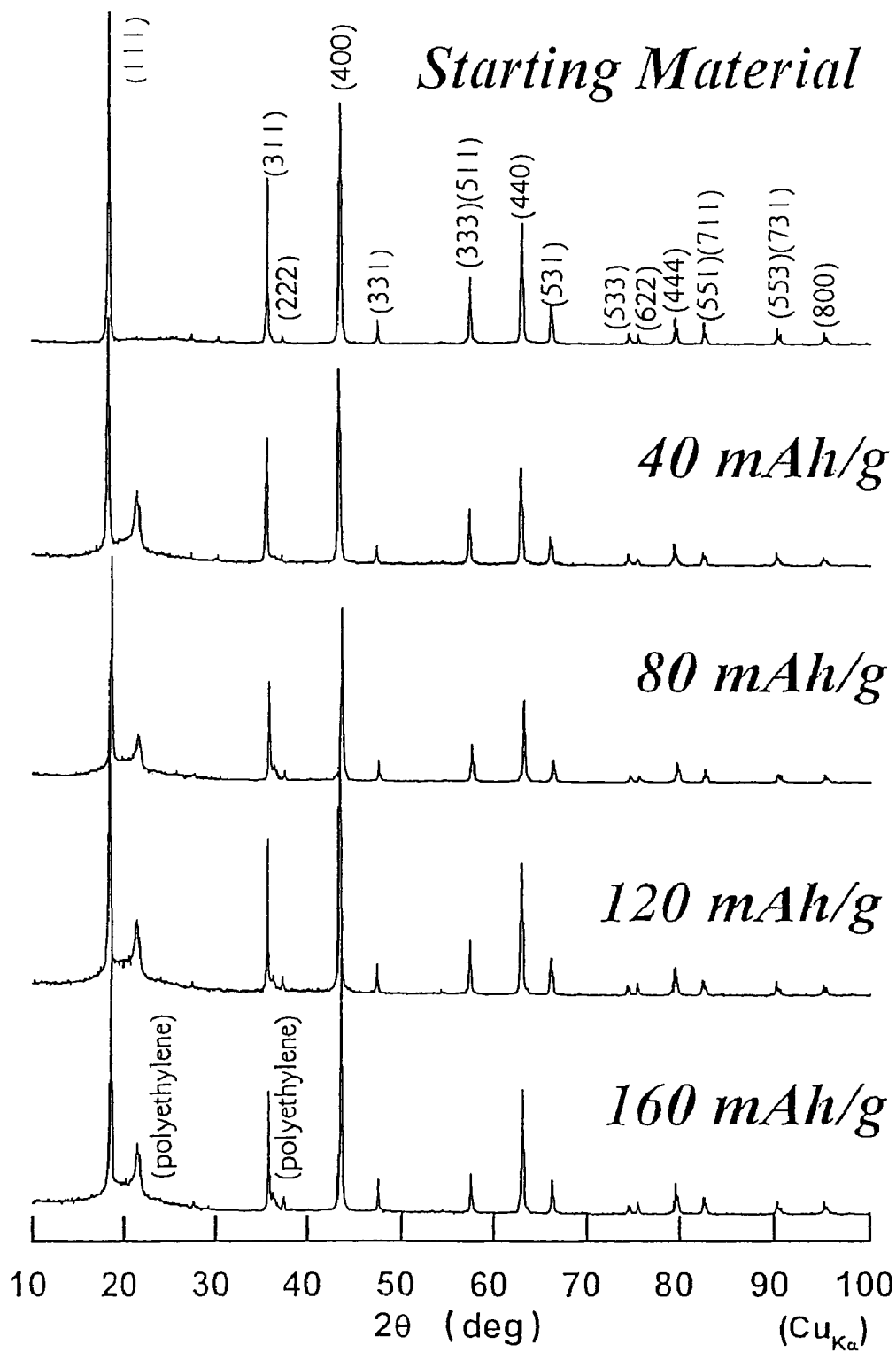
FIG. 2 is a graph showing the volume change of a negative electrode of a lithium titanium oxide during charge and discharge.

First, a description is given of the volume change of a titanium oxide as the negative electrode active material. FIG. 1 shows the charge/discharge curve of $Li_4Ti_5O_{12}$. It is clear from FIG. 1 that the curve of $Li_4Ti_5O_{12}$ is almost completely flat at a potential of 1.55 V relative to that of lithium metal. FIG. 2 shows the change in the X-ray diffraction pattern during charge and discharge. It is evident from FIG. 2 that the peaks of the X-ray diffraction pattern are indexed as the crystal system Fd3m, and a is 8.370±0.005 in the charge/discharge range, indicating that the volume of the negative electrode does not theoretically change at all in the charge/discharge range.

Figure 3:
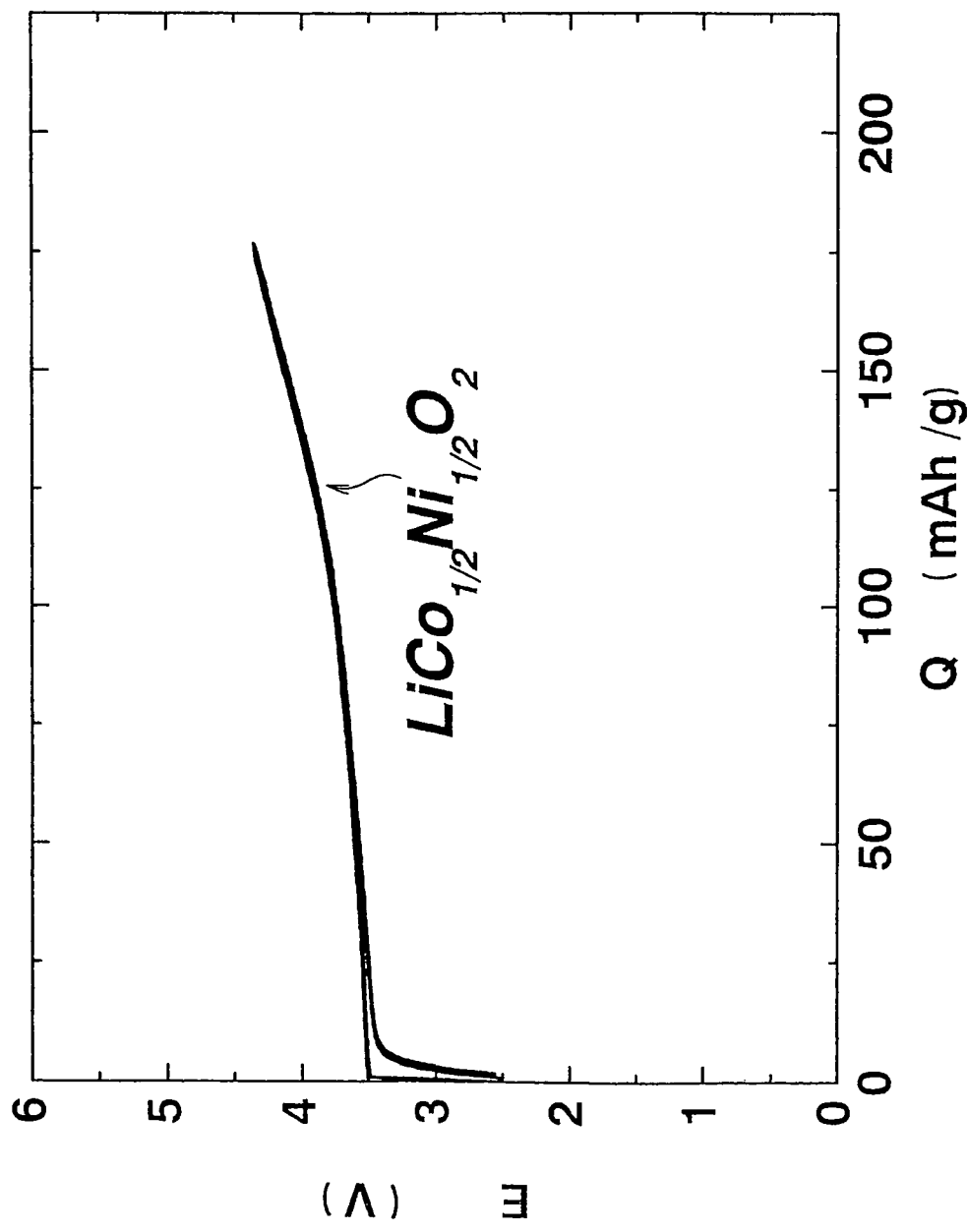
FIG. 3 is a graph showing the charge/discharge behavior of $Li_{1\pm x}Ni_{1/2}Co_{1/2}O_2$.
Figure 4:
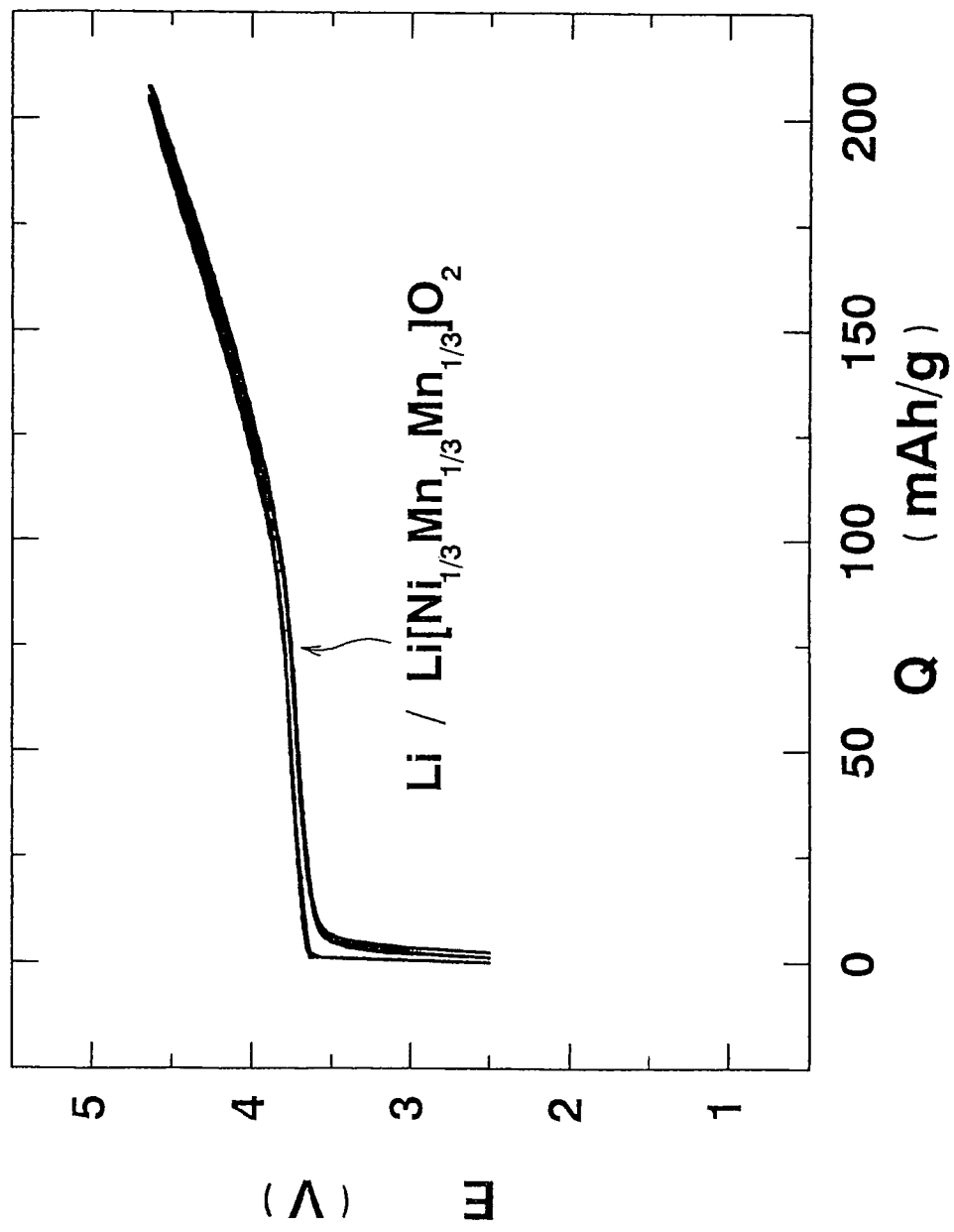
FIG. 4 is a graph showing the charge/discharge behavior of $Li_{1\pm x}Ni_{1/3}Mn_{1/3}Co_{1/2}O_2$.

FIG. 3 shows the charge/discharge curve of $Li_{1\pm x}Ni_{1/2}Co_{1/2}O_2$ ($x \leq 0.1$) as the positive electrode active material. FIG. 4 shows the charge/discharge curve of $Li_{1\pm x}Ni_{1/3}Co_{1/3}Mn_{1/3}O_2$ ($x \leq 0.1$) as the same. These materials enable charge and discharge in a potential range almost similar to that of a known lithium nickel oxide and provide an average voltage of about 3.6 V relative to that of lithium metal. Accordingly, it is apparent from FIGS. 1, 3 and 4 that the battery systems produced by the combination of the titanium oxide and the lithium nickel oxide has a charge/discharge potential of 2 V.

Figure 5:
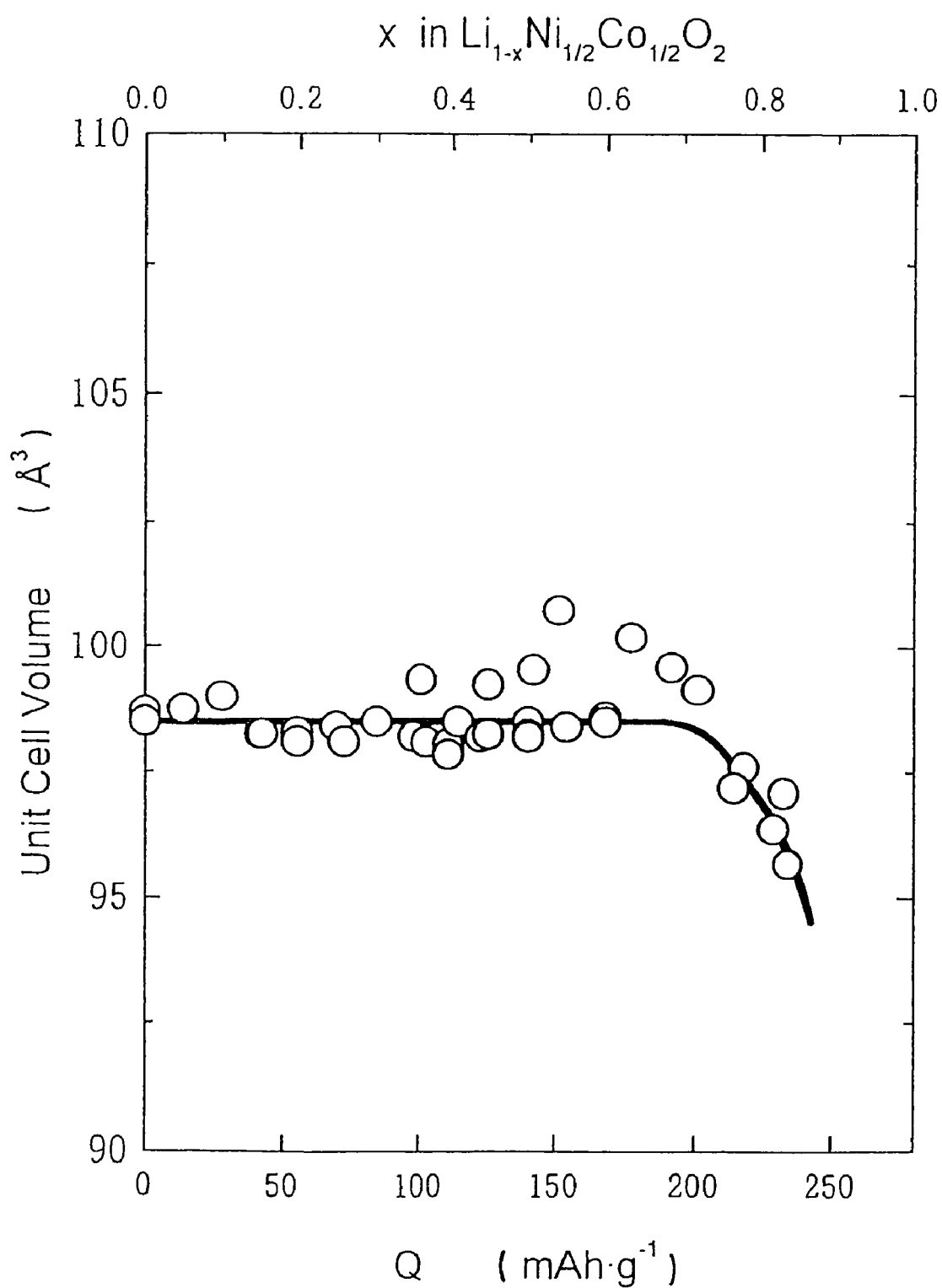
FIG. 5 is a graph showing the volume change of $Li_{1\pm x}Ni_{1/2}Co_{1/2}O_2$ during charge and discharge.
Figure 6:
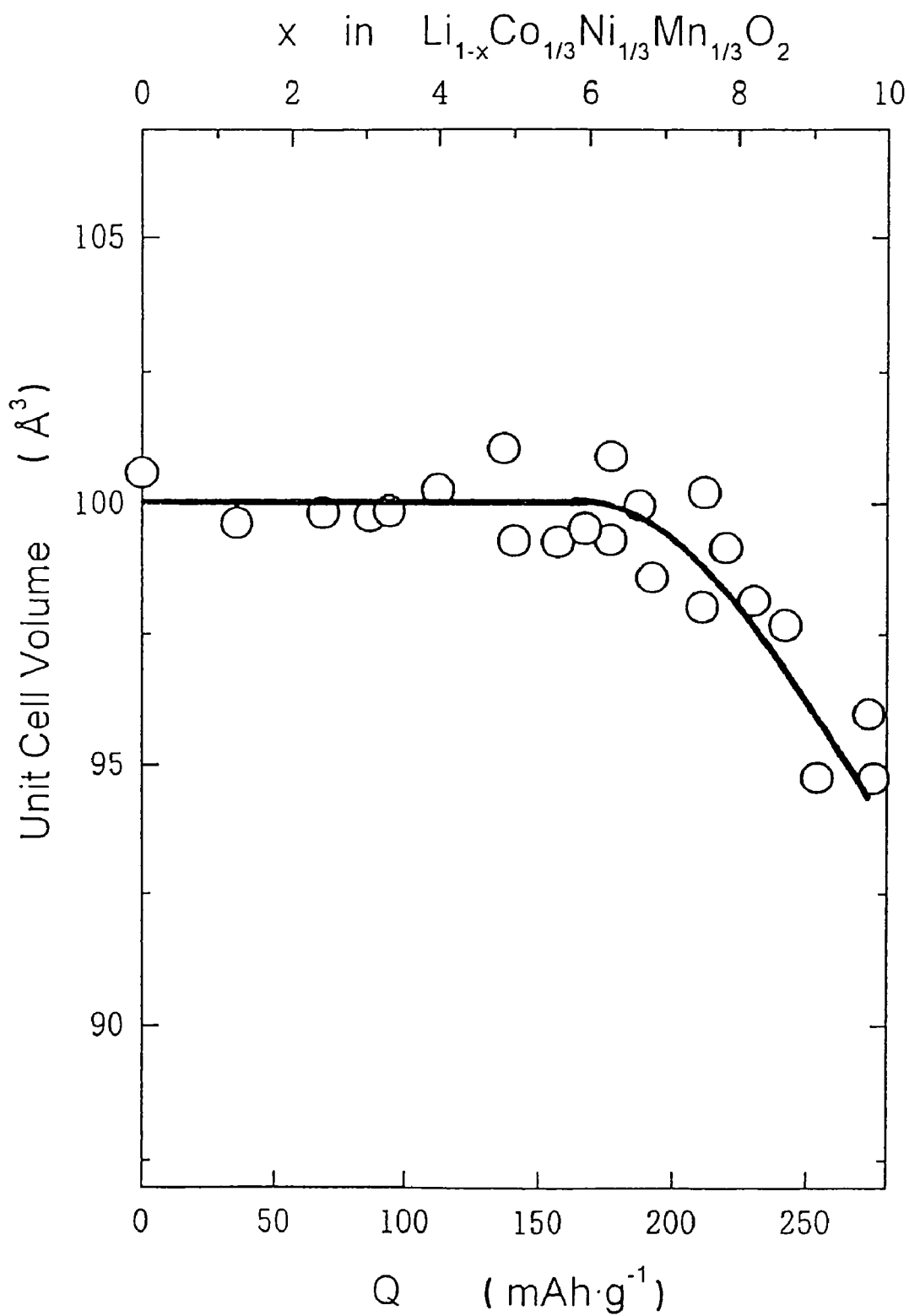
FIG. 6 is a graph showing the volume change of $Li_{1\pm x}Ni_{1/3}Mn_{1/3}Co_{1/2}O_2$ during charge and discharge.

FIGS. 5 and 6 show the volume change of the positive electrode active material during charge and discharge calculated by X-ray diffraction. It is clear from FIGS. 5 and 6 that, in the unit cells (batteries) using the two positive electrode active materials, no volume change occurred in a designed charge/discharge capacity range of 0 to 200 mAh/g.

We examined the volume change of positive electrode active materials made of various different oxides during charging and discharging, and found out that, when the positive electrode active material contains nickel and cobalt atoms in the same ratio, the volume change in the unit cell is almost zero. Similarly, even when an element other than nickel and cobalt is added to the positive electrode active material such as $Li_{1\pm x}Ni_{1/3}Co_{1/3}Mn_{1/3}O_2$ ($x \leq 0.1$), the volume change is almost zero. Accordingly, the important point in the positive electrode active material of the present invention is that the positive electrode active material contains at least nickel and cobalt atoms at the same ratio.

(3) Particle Size and Morphology

Figure 7:
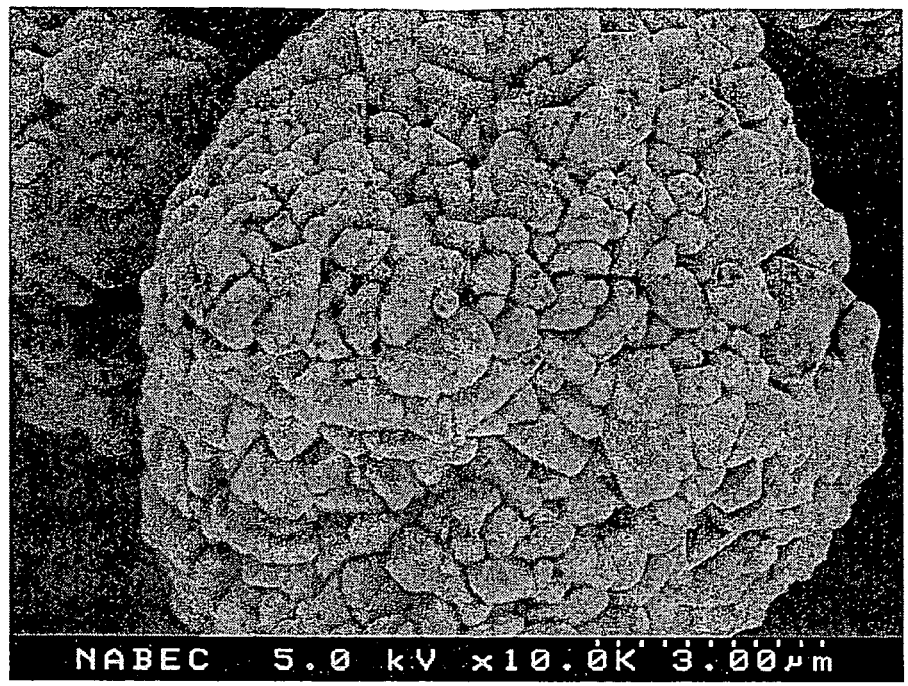
FIG. 7 is a SEM image showing the morphology of a positive electrode material.
Figure 8:
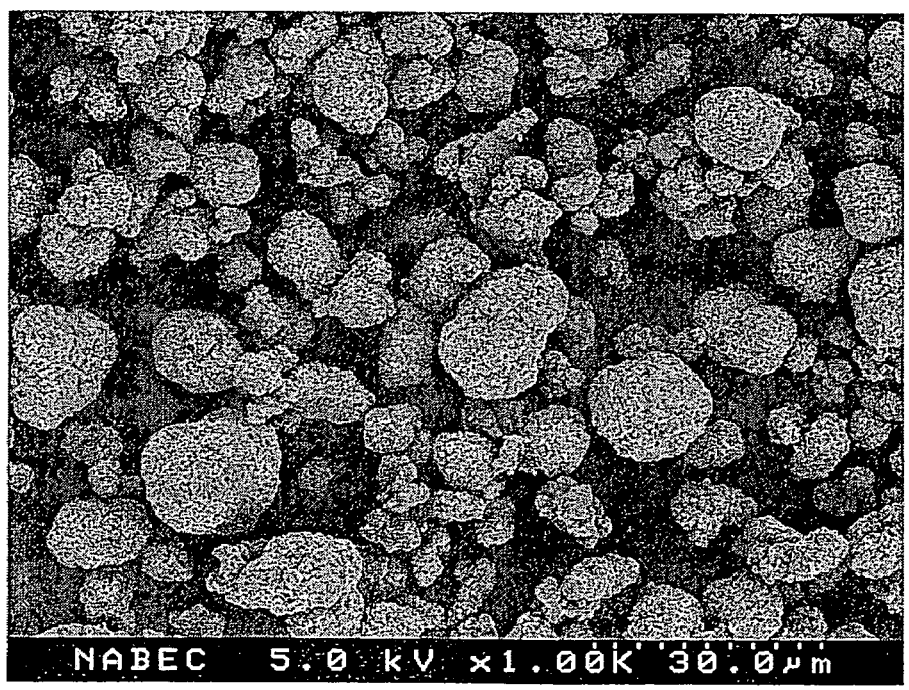
FIG. 8 is another SEM image showing the morphology of the same.

FIGS. 7 and 8 show SEM images of the positive electrode active material particles. It is clear that the positive electrode active material is in the form of a powder and includes primary crystalline particles having a particle size of about 0.1 to 8 μm and secondary crystalline particles having a particle size of 2 to 30 μm. The secondary crystalline particles are made of the primary crystalline particles. Likewise, the particle morphology of $Li_4Ti_5O_{12}$ was observed by SEM, and it was found that primary particles having a particle size of about not greater than 0.6 μm aggregate to form a secondary particle with an average particle size of about 1 μm. In the present invention, the material having the aforementioned powder property was used.

(4) Charge Control

The battery in accordance with the present invention has excellent characteristics in terms of charge control when it is used for idle stop of automobile. The battery used in such application is kept typically 60 to 70% charged, instead of fully charged. The reason for this is that regenerative charging is performed during driving so that if the battery is fully charged, it will be unsuitably overcharged. At the same time, the battery desirably functions as a constant-voltage power source during discharge. Accordingly, regarding the charge/discharge voltage of the battery, it is preferred in the charge/discharge curve that the battery provides a flat potential of 2 V until the capacity is about 60% filled and the voltage is increased linearly proportional to the capacity in the more charged range. It is common and easy to control charging by the voltage of the battery. Accordingly, the charging condition of the battery can be accurately identified from the linear voltage change in that range.

Figure 9:
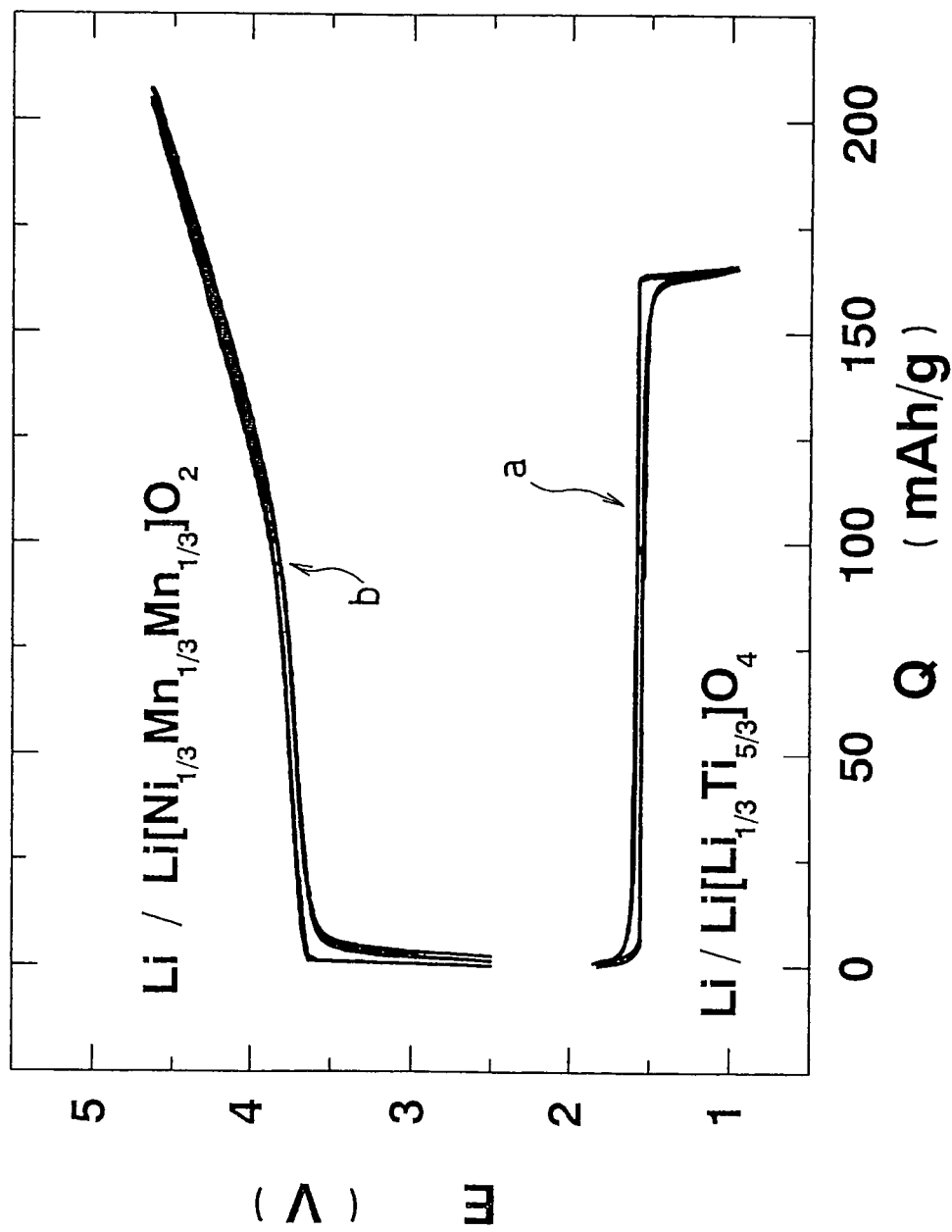
FIG. 9 is a graph showing the charge/discharge behavior of $Li_{1\pm x}Ni_{1/3}Co_{1/3}Mn_{1/3}O_2$ and that of $Li_4Ti_5O_{12}$.
Figure 10:
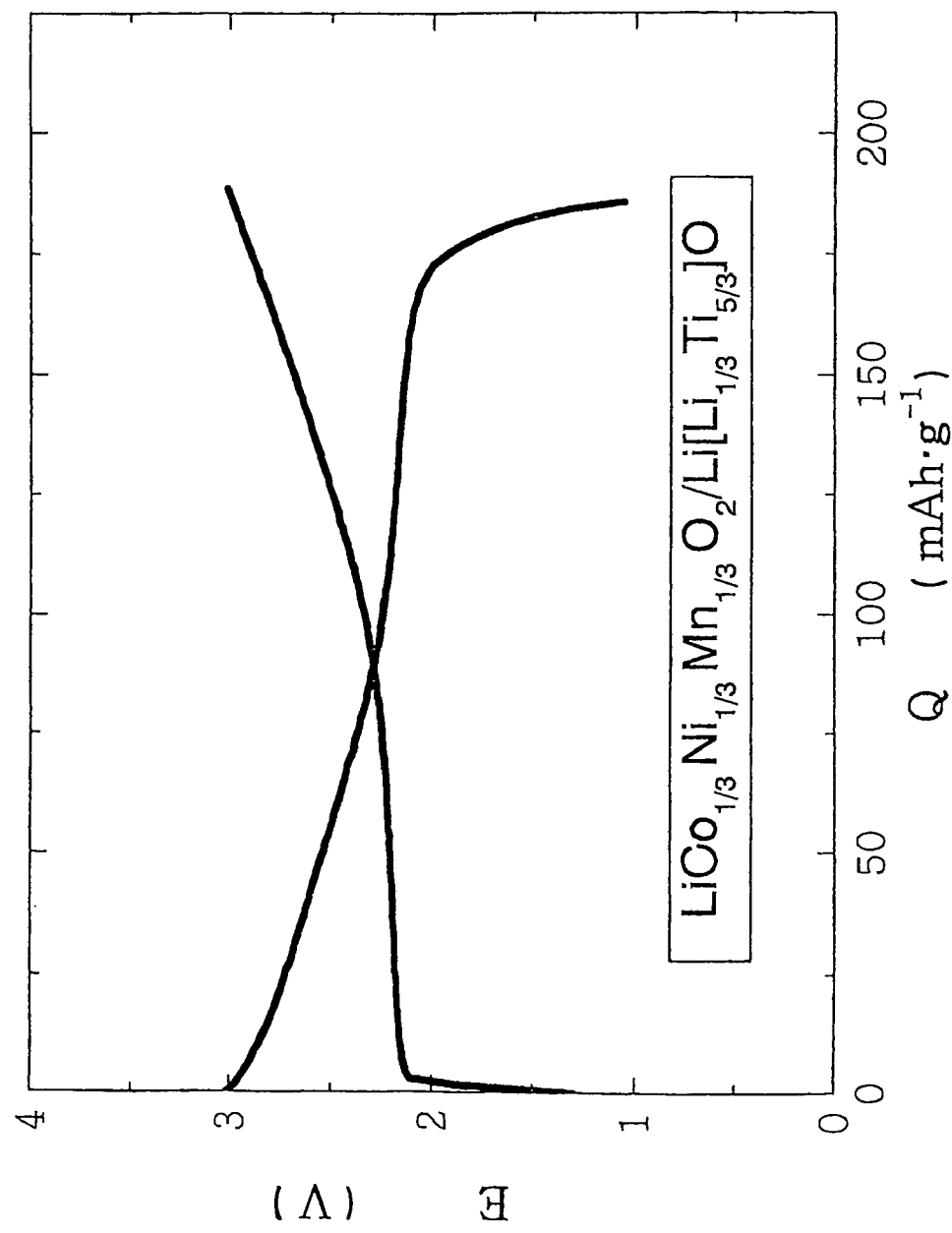
FIG. 10 is a graph showing the charge/discharge behavior of the battery according to one embodiment of the present invention.

FIG. 9 shows the charge/discharge curve "b" of the positive electrode using $Li_{1\pm x}Ni_{1/3}Co_{1/3}Mn_{1/3}O_2$ (x≦0.1) and the charge/discharge curve "a" of the negative electrode using $Li_4Ti_5O_{12}$. FIG. 10 shows the charge/discharge curve of the battery. Since the charge/discharge curve "a" of the negative electrode is completely flat throughout the range, the shape of the charge/discharge curve "b" of the positive electrode corresponds to the shape of the charge/discharge curve of the battery itself. As is obvious from the charge/discharge curve "b" of FIG. 9, the charge/discharge curve of the positive electrode is flat until about 60% of the whole range (the full charge capacity), and the potential increases almost linearly as the charge proceeds more. Although not so remarkable as the case of $Li_{1\pm x}Ni_{1/3}Co_{1/3}Mn_{1/3}O_2$, a similar tendancy was observed in the case of using $Li_{1\pm x}Ni_{1/2}Co_{1/2}O_2$.

The foregoing reveals that the battery in accordance with the present invention is a battery system suitable for charge control as described above such as for idle stop of automobile. The combinations of the positive and negative electrode active materials for such application were discovered as a result of extensive study by the present inventors, which cannot be found in existing patents and prior art documents regarding the study from the same viewpoint.

(5) Capacity Design of Positive and Negative Electrodes

When designing the capacity of a battery, the capacity regulated (controlled) by either positive or negative electrode capacity. Such capacity regulation (control) of positive or negative electrode is deliberately designed in view of the application of device to be used or the characteristics of active material. In the 2 V level battery system of the present invention, it is preferred to regulate the capacity of the negative electrode. More specifically, it is preferred that the ratio of the negative electrode active material to the positive electrode active material be not less than 0.5 and less than 1.2. The ratio of less than 1.2 is set to compensate the difference of the capacity because the theoretical charge/discharge capacity per gram of the negative electrode exceeds that of the positive electrode. It can be said that, practically, the battery system of the present invention is a battery regulated by the negative electrode. The reason that the battery system regulated by the negative electrode is more preferred is described below. The potential of the positive electrode is 4 V or more relative to that of lithium. To complete charging by increasing the potential of the positive electrode more is disadvantageous in terms of stability of the electrolyte because the positive electrode may have poor oxidation resistance depending on the electrolyte to be used. Additionally, when lithium atoms are completely desorbed and removed from the positive electrode active material, oxygen is gradually released to cause material degradation and oxidation of the electrolyte, which may lead to degradation of cycle life and battery performance.

(6) Current Collector for Positive and Negative Electrodes

In currently commercially available lithium ion secondary batteries, aluminum is typically used as the current collector for positive electrode, and copper is typically used as the current collector for negative electrode. Those metal materials with excellent corrosion resistance are used in view of the potential of each electrode. Japanese Laid-Open Patent Publications Nos. 2001-210324 and 2001-243952 disclosing a technique using a lithium-containing titanium oxide as a negative electrode active material state clearly that aluminum is used as the current collector for positive electrode and copper is used as the current collector for negative electrode.

In the present invention, aluminum or an aluminum alloy is preferably used as the current collector material for both positive and negative electrodes. The reason for this is as follows. The use of aluminum instead of copper achieves weight reduction of the battery as well as cost reduction. In currently available battery systems using graphite in the negative electrodes, aluminum cannot be used as the current collector because the potential is as low as 0.2 V or lower relative to that of lithium metal. This is because aluminum starts to react with lithium ions at a potential higher than the potential of graphite in the negative electrode during charging and discharging.

In the battery system of the present invention, however, the charge/discharge potential of the negative electrode is as high as 1.5 V so that aluminum, which does not react unless the potential reaches 1.5 V or lower, can be used. When copper is used, the potential of the negative electrode may increases by deep discharge or the like, and copper ions dissolve into the electrolyte. Then, the copper ions may be deposited on the negative electrode by recharge prior to the insertion reaction of lithium, inhibiting the insertion reaction of lithium. As a result, lithium may be deposited as a metal on the surface of the negative electrode in the form of a dendrite crystal, which reduces the safety of the battery and the cycle life. When aluminum is used, on the other hand, the dissolving of metal ions and the redeposition do not occur.

When the battery, of which the negative electrode is regulated, is connected to a charger and the charger breaks down, the battery will be overcharged, which means excessive lithium is supplied to the negative electrode. If the current collector for negative electrode is copper in this situation, excessive lithium metal will be deposited on the negative electrode in the form of a dendrite crystal. The dendrite crystal reduces the safety of the battery during overcharge. Aluminum, however, has the capability of adequately absorbing lithium. Accordingly, when the current collector for negative electrode is aluminum, lithium can be absorbed into the current collector when the battery is overcharged, and lithium metal is not deposited on the negative electrode. Thereby, the current collector using aluminum will play the role of a kind of safety mechanism, and the safety of the battery during overcharge will not be reduced.

(7) Separator

Most of the commonly available batteries using the combination of $LiCoO_2$ and a carbonaceous material employ a porous film made of polyethylene or propylene as the separator. Such separator is very costly because it is produced by melting and extruding a polymer material to be molded and, then, extended in two axial directions to form a thin porous film. The reason for necessitating this film is presumably as follows. The aforesaid battery uses graphite in the negative electrode so that the potential of the negative electrode decreases almost to a potential at which a lithium metal is deposited. This creates various problems. For example, a trace amount of lithium may be deposited on a part of the surface of graphite by rapid charging or charging at a low temperature. Alternatively, cobalt and metal impurities may dissolve due to excessive floating charge and be deposited on the negative electrode, causing internal short-circuiting. In order to minimize such phenomenon, a microporous olefin film having mechanical strength and fine pores is used.

Further, in order to ensure safety during overcharge such as the case of the breakdown of a charger, a shutdown function to prevent an increase in battery temperature during overcharge is added to the separator. This shutdown function means a function of stopping a current between the electrodes by contracting and crushing the micropores of the separator upon reaching a specified temperature (about 135° C.).

For the reasons stated above, costly porous films have been used as the separator in conventional batteries using the combination of $LiCoO_2$ and a carbonaceous material. Such separators are accompanied by the problem in that, because the separator has small-sized pores, the separator acts as a resistance to ion transfer and the high rate characteristic is harmed.

In the battery system of the present invention, however, the problems described above do not occur because the potential of the negative electrode is 1.55 V, which is very different from the potential at which lithium is deposited. When aluminum is used as the current collector for negative electrode, lithium is absorbed thereinto so that the problem of metal deposition during overcharge does not occur. In other words, the sophisticated shutdown function that the conventional porous films have is not necessary. For the above reasons, in the battery in accordance with the present invention, the use of the current collector made of, preferably, aluminum or an aluminum alloy enables the use of a material having large-sized pores such as non-woven fabric. Since non-woven fabric has relatively large pores and excellent retention of electrolyte, it is possible to remarkably improve the high rate characteristics of the battery to be obtained, particularly the pulse characteristics. Moreover, advanced and complicated production process like a porous film is not necessary for non-woven fabric so that the range of choices for separators is extended as well as the production cost is reduced. In the present invention, non-woven fabric having an average pore size of not less than 0.1 µm is preferably used.

Considering the application thereof for the battery in accordance with the present invention, preferred materials that constitute the separator include polyethylene, polypropylene, polybutylene terephthalate and any mixtures thereof. Polyethylene and polypropylene are stable in an electrolyte. When mechanical strength at a high temperature is required, polybutylene terephthalate is preferred to use. The materials constitute the non-woven fabric preferably have a fiber diameter of about 1 to 3 µm. Non-woven fabric whose fibers are partly melt and bonded by humidified calendar roll process is effective in reducing the thickness and improving the mechanical strength.

(8) Non-Aqueous Electrolyte

A description will be given of a preferred electrolyte used in the 2 V level non-aqueous electrolyte secondary battery in accordance with the present invention. An organic solvent used in the electrolyte has a potential window. A potential window is a scale for oxidation resistance and reducing property. The wider the potential window is, the more stable the organic solvent is. Commonly available non-aqueous electrolyte secondary batteries using the combination of $LiCoO_2$ and a carbonaceous material are required to have oxidation resistance to a potential close to 4.5 V which is the charge/discharge potential of cobalt and reduction resistance to a potential close to 0 V which is the charge/discharge potential of graphite. It is to be noted that the term "potential" used herein means a potential relative to that of lithium metal (the same applies hereinafter).

Accordingly, the organic solvents that cannot satisfy these potential windows have been excluded from the options. Particularly, it has been difficult to use lactone type solvents by reason of resistance to reduction when graphite is used in the negative electrode. The use of propylene carbonate has also been difficult because it is decomposed during charging and discharging. They are useful solvents because they are inexpensive and have a high dielectric constant and therefore the ability to thoroughly dissolve any electrolyte (solute, salt), as well as excellent oxidation resistance. For the same reason stated above, the use of trimethyl phosphate and triethyl phosphate has been difficult. These solvents have fire-extinguishing ability and therefore are excellent in safety.

In the battery of the present invention, all the solvents having those useful characteristics can be used by using the materials described above. In the present invention, instead of graphite, $Li_4Ti_5O_{12}(Li[Li_{1/3}Ti_{5/3}]O_4)$ is used in the negative electrode. This increases the potential of the negative electrode to 1.55 V so that the resistance to reduction that the solvent is required to have will be greatly reduced. Moreover, a solvent like propylene carbonate, which is dissolved on the surface of the negative electrode due to the charge and discharge when the graphite is used in the negative electrode, can become usable as an extremely advantageous solvent in the present invention.

Along with the above, the potential of the positive electrode will be increased to 4.7 V or more, but there is no problem with using these solvents because the oxidation thereof occurs at 5 V or more. Further, the solvents having excellent oxidation resistance such as sulfolane, methyldiglyme and fluorinated ethylene carbonate are also suitable for the battery in accordance with the present invention. The solvents that have conventionally been used such as DEC (dimethyl carbonate), MEC (methyl ethyl carbonate) and DMC (dimethyl carbonate) can be used as a diluent for a solvent with high viscosity.

In particular, although ethylene carbonate (EC) is not necessarily required for the present invention, EC is a solvent having a high dielectric constant and therefore is useful for the stability of electrolyte. The oxidation resistance can be enhanced by fluorinating hydrogen in EC. The fluorination has been considered useful for reducing $CO_2$ gas presumably resulting from the decomposition of EC on the positive electrode during high temperature storage of the battery. However, the use of fluorinated EC has been difficult in the case of using a carbonaceous material in the negative electrode because fluorinated EC is reduced and decomposed. In the present invention, however, these useful solvents can be used. In other words, the range of choices for electrolytes can be extended by not using graphite.

As for the solute, there is no limitation, and conventionally used $LiPF_6$ and $LiBF_4$ as well as lithium salts with an organic anion can be used.

In conventional batteries, the selection of an ionic liquid, which would be very useful if it can be used singly, is limited because a carbonaceous material is used in the negative electrode, making the use of an ionic liquid difficult. The present inventors also examined the possibility of using an ionic liquid specifically. Although it is preferred to use an ionic liquid singly from the viewpoint of safety, the ionic liquid may be mixed with the aforementioned solvent(s) for use when the ionic liquid is in solid form or has a high viscosity, or when existing production equipment must be used to produce the batteries. The superiority thereof can be ensured to a certain degree even if the ionic liquid is mixed with the solvent(s).

Figure 11:
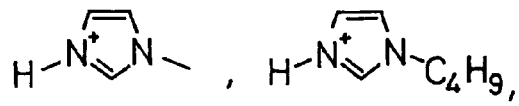
FIG. 11 shows the chemical structures of ionic liquid cations.
Figure 11:
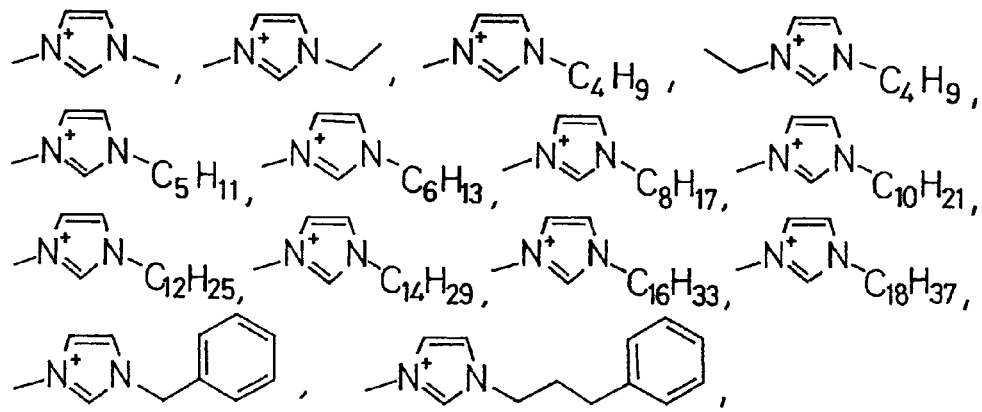
Figure 11:
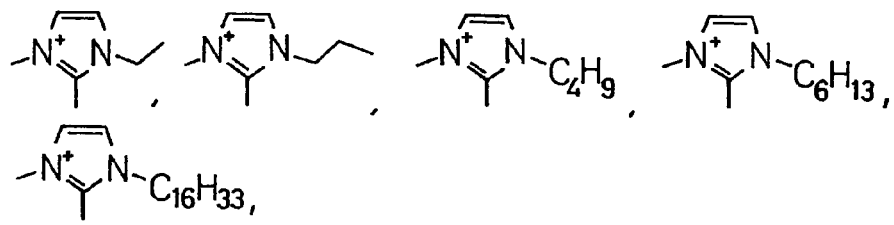
Figure 11:
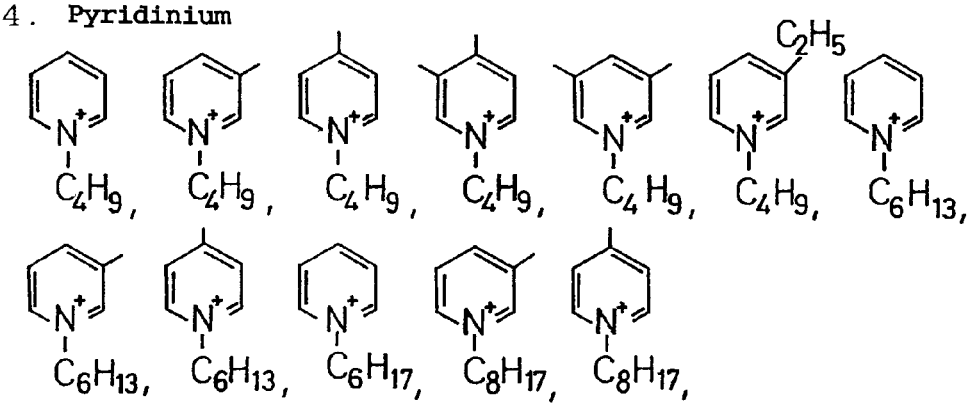
Figure 12:
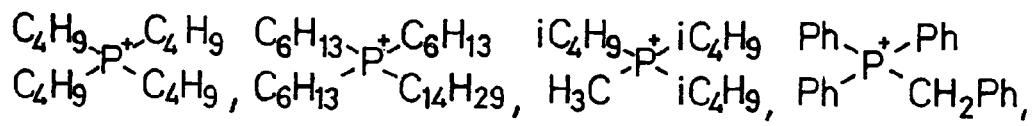
FIG. 12 shows the chemical structures of ionic liquid cations.
Figure 12:
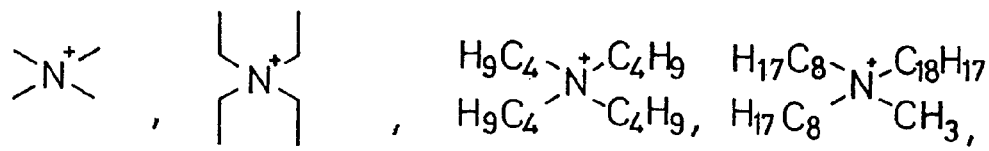
Figure 12:
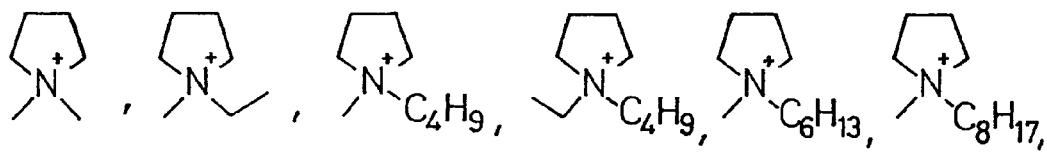
Figure 12:
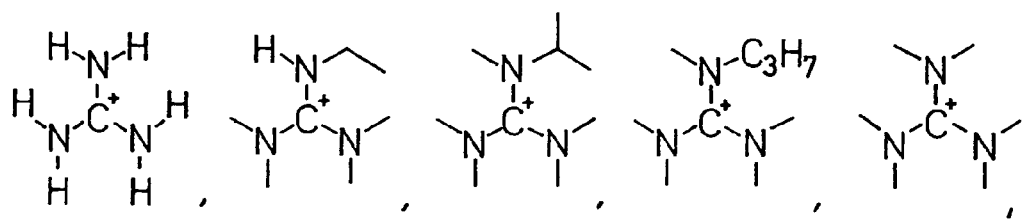
Figure 12:
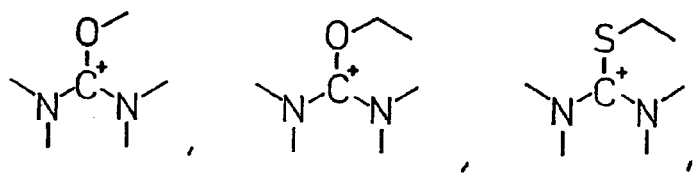
Figure 13:
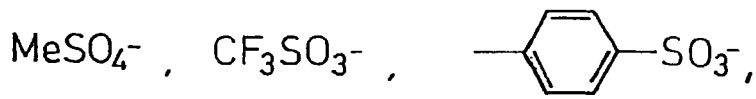
FIG. 13 shows the chemical structures of ionic liquid anions.
Figure 13:
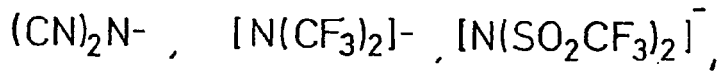
Figure 13:
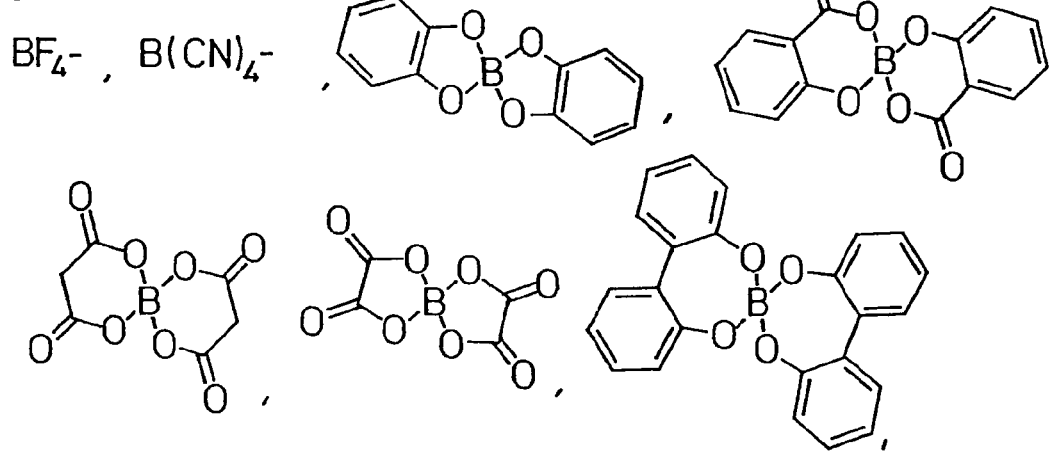
Figure 13:
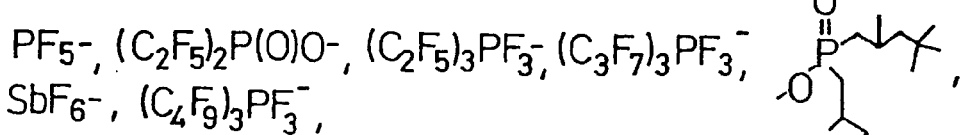

Examples of ionic liquids are given below. As ionic liquid cations, there are 1-, 2-, or 3-substituted imidazolium, pyridinium, phosphonium, ammonium, pyrrolidinium, guanidinium and isouronium. As ionic liquid anions, there are halogen, sulfate, sulfonate, amide, imide, methane, borate, phosphate, antimonate, decanate and cobalt tetracarbonyl. FIGS. 11 and 12 show the structures of the cations and FIG. 13 shows the structures of the anions.

In the present invention, a detailed examination was made particularly on the ionic liquid including the combination of trimethylpropylammonium cation and trifluoromethylsulfonyl imide anion and the one including the combination of 1-ethyl-3-methyl imidazolium cation and trifluoromethyl imide anion. The latter imidazolium-based ionic liquid causes reduction decomposition at around 1 V so that the use thereof is extremely difficult when a carbonaceous material is used in the negative electrode. Further, it has been ascertained that, even when the above ionic liquid and conventional non-aqueous electrolyte containing ethylene carbonate and the like are mixed, the produced batteries operate analogously to conventional ones and have superiority.

(9) Other Components

A description will be given of other usable components in the case of producing the non-aqueous electrolyte secondary battery in accordance with the present invention.

The conductive material to be contained in the positive electrode material mixture used for producing the positive electrode in the present invention may be any electronically conductive material as long as it does not cause a chemical change in the produced battery. Examples thereof include: graphite such as natural graphite (flake graphite, etc) and artificial graphite; carbon blacks such as acetylene black, Ketjen black, channel black, furnace black, lamp black and thermal black; conductive fibers such as carbon fiber and metal fiber; fluorinated carbon; metal powders such as copper powders, nickel powders, aluminum powders and silver powders; conductive whiskers such as zinc oxide whisker and potassium titanate whisker; conductive metal oxides such as titanium oxide; and organic conductive materials such as polyphenylene derivative. They may be used singly or in any arbitrary combination thereof as long as the effect of the present invention is not impaired.

Among the above, particularly preferred are artificial graphite, acetylene black and nickel powders. The preferred amount of the conductive material is, but not limited to, 1 to 50 wt %, and more preferably 1 to 30 wt %. In the case of the conductive material being carbon or graphite, the preferred amount thereof is 2 to 15 wt %.

The preferred binder in the positive electrode active material in the present invention is a polymer with a decomposition temperature of not less than 300° C. Examples thereof include polyethylene, polypropylene, polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethyelene copolymer and vinylidene fluoride-perfluoromethylvinylether-tetrafluoroethylene copolymer.

They may be used singly or in any arbitrary combination thereof as long as the effect of the present invention is not impaired. Among them, particularly preferred are polyvinylidene fluoride (PVDF) and polytetrafluoroethylene (PTFE).

The current collector for the positive electrode may be any electronically conductive material as long as it does not cause a chemical change in the produced battery. As the material constituting the current collector, there are, for example, stainless steel, nickel, aluminum, titanium, any alloy thereof and carbon, as well as composites produced by, for example, treating the surface of aluminum or stainless steel with carbon, nickel, titanium or silver. Particularly, aluminum or an aluminum alloy is preferred as described above. The surface of the material may be oxidized. The surface of the current collector may be roughened to have concave and convex portions (surfaces) by surface treatment. The current collector may be in the form of a foil, a film, a sheet, a net, a punched sheet, a lath, a porous sheet, a foam, a fiber bundle or a non-woven fabric. The preferred thickness of the current collector is, but not limited to, 1 to 500 µm.

The conductive material to be contained in the negative electrode material mixture may be any electronically conductive material as long as it does not cause a chemical change in the produced battery, similar to that of the positive electrode material mixture. As the binder for the negative electrode, not only the above-described materials usable for the positive electrode, but also rubber binders such as styrene butadiene rubber can be used.

As the current collector for the negative electrode, the use of aluminum or an aluminum alloy is particularly preferred because of the reasons stated above. Other than the above, any electronically conductive material can be used as long as it does not cause a chemical change in the produced battery. Examples include stainless steel, nickel, copper, titanium, carbon, an Al—Cd alloy and composites produced by treating the surface of copper or stainless steel with carbon, nickel, titanium or silver. The surface of the material may be oxidized, or the surface of the current collector may be roughened to have concave and convex portions (surfaces) by surface treatment. The current collector may be in the form of a foil, a film, a sheet, a net, a punched sheet, a lath, a porous sheet, a foam or a molded article formed by fiber bundle. The preferred thickness of the current collector is, but not limited to, 1 to 500 μm.

The positive and negative electrodes of the battery in the present invention may have, in addition to the material mixture layer containing the positive electrode active material or the negative electrode material, a undercoat intended to improve the adhesion of the material mixture layer to the current collector, the conductivity, the cycle characteristics and the charge/discharge efficiency and a protective layer intend for mechanical and chemical protection of the mixture layer. The undercoat layer and the protective layer may contain a binder or electrically conductive particles and electrically non-conductive particles.

It has been stated earlier in this specification that the range for choices for the non-aqueous electrolyte is extended, and it should be understood that it is also possible to use or mix a conventionally well-known electrolyte as listed below. The non-aqueous electrolyte includes a solvent and a lithium salt dissolved therein. The preferred solvent is one ester or an ester mixture. Particularly, cyclic carbonates, cyclic carboxylic acid esters, non-cyclic carbonates and aliphatic carboxylic acid esters are preferred. Further preferred are solvent mixtures containing cyclic carbonates and non-cyclic carbonates, solvent mixtures containing cyclic carboxylic acid esters, and solvent mixtures containing cyclic carboxylic acid esters and cyclic carbonates. Examples of the ester include: cyclic carbonates such as ethylene carbonate (EC), propylene carbonate (PC), butylene carbonate (BC) and vinylene carbonate (VC); non-cyclic carbonates such as dimethyl carbonate (DMC), diethyl carbonate (DEC), ethyl methyl carbonate (EMC), and dipropyl carbonate (DPC); aliphatic carboxylic acid esters such as methyl formate (MF), methyl acetate (MA), methyl propionate (MP) and ethyl propionate (MA); and cyclic carboxylic acid esters such as γ-butyrolactone (GBL). Optionally, the solvent mixture may contain an aliphatic carboxylic acid ester. The amount of the aliphatic carboxylic acid ester is preferably not greater than 30 wt % of the whole weight of the solvent, more preferably not greater than 20 wt % of the same.

Examples of the lithium salt dissolved in the solvent include $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, chloroborane lithium, lithium tetraphenyl borate, and imides such as $LiN(CF_3SO_2)(C_2F_5SO_2)$, $LiN(CF_3SO_2)_2$, $LiN(C_2F_5SO_2)_2$ and $LiN(CF_3SO_2)(C_4F_9SO_2)$. They may be used, in the electrolyte solution to be used, singly or in any arbitrary combination as long as the effect of the present invention is not impaired. Among them, particularly preferred is $LiPF_6$. The amount of the electrolyte is not specifically limited, and the optimum amount should be used according to the amount of the positive electrode active material or negative electrode material, or to the battery size. The preferred amount of the lithium salt to the non-aqueous solvent is, but not limited to, 0.2 to 2 mol/liter.

The electrolyte is not necessarily in liquid form, and may be a solid electrolyte. Solid electrolytes can be classified into an inorganic solid electrolyte and an organic solid electrolyte. Well-known inorganic solid electrolytes are nitrides, halides, oxyacid salts or the like of Li. Specifically, $80Li_2S$-$20P_2O_5$, the sulfides such as $Li_3PO_4$-$63Li_2S$-$36SiS_2$, $44LiI$-$38Li_2S$-$18P_2S_5$, the oxide such as $La_{2.9}PO_{3.3}N_{0.46}$ as an amorphous material, the sulfide such as $Li_{3.25}Ge_{0.25}P_{0.75}S_4$, the oxides such as $La_{0.56}Li_{0.33}TiO_3$, $Li_{1.4}Al_{0.3}Ti_{1.6}(PO_4)_3$ as a crystalline material are promising. Further, the method using a sintered mixture of $LiF$ and $LiBO_2$ in which, when the materials are sintered, a solid electrolyte layer is formed on the bonded interface of the materials is also promising. Since the positive and negative electrodes of the battery system of the present invention have no volume change, it is expectable that the separation of the interface between electrodes and solid electrolyte layer caused by the expansion and contraction, which has been considered a problem for the use of a solid electrolyte, will be largely prevented.

As the organic solid electrolyte, polymer materials are effective. Examples of the polymer materials include polyethylene oxide, polypropylene oxide, polyphosphazene, polyaziridine, polyethylene sulfide, polyvinyl alcohol, polyvinylidene fluoride, polyhexafluoropropylene, any derivative thereof, any mixture thereof and any composite thereof. A gel electrolyte prepared by mixing the organic solid electrolyte with the above-described non-aqueous electrolyte may be used. Particularly preferred are a copolymer of vinylidene fluoride and hexafluoropropylene and a mixture of polyvinylidene fluoride and polyethylene oxide.

The battery may be in any shape including coin, button, sheet, cylinder, flat shape and prism. In the case of the battery being in the shape of a coin or button, the material mixtures of the positive electrode active material and the negative electrode material should be compressed into pellets. The thickness and diameter of the pellets can be determined by the battery size. The wound electrode group (assembly) in the present invention is not necessarily in the shape of a perfect cylinder and may be in the shape of an elliptic cylinder whose cross section is an ellipse or of a rectangular column.

Figure 16:
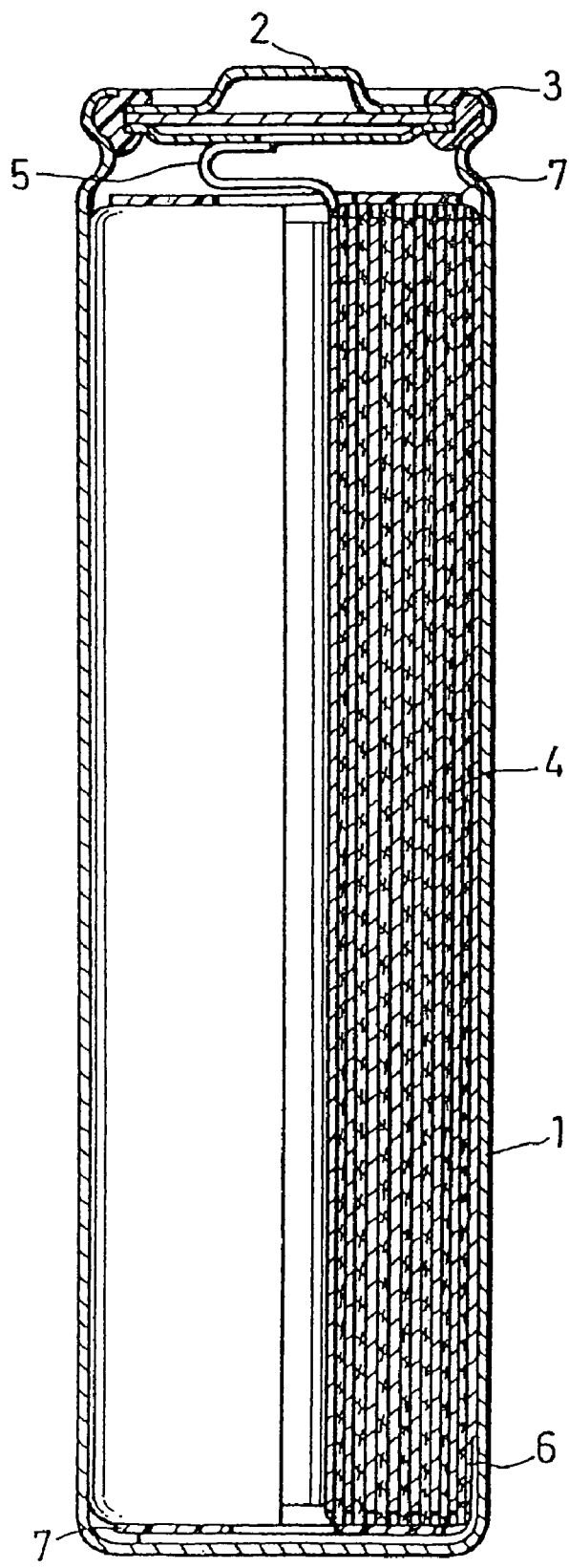
FIG. 16 is a schematic cross sectional view of a cylindrical battery produced in EXAMPLEs.

FIG. 16 shows a cross sectional view of a cylindrical battery according to one embodiment of the present invention. In the cylindrical battery shown in FIG. 16, an electrode assembly 4 obtained by spirally rolling up positive and negative electrodes with a separator interposed therebetween is housed in a battery case 1. A positive electrode lead 5 of the positive electrode is connected to a sealing plate 2, and a negative electrode lead 6 of the negative electrode is connected to the bottom of the battery case 1. The battery case and the lead plates can be made of an electronically conductive metal having chemical resistance to organic electrolyte. For example, a metal such as iron, nickel, titanium, chromium, molybdenum, copper and aluminum or an alloy thereof can be used. Specifically, the battery case is preferably made by processing a stainless steel plate or an Al—Mn alloy plate. The positive electrode lead is preferably made of aluminum. The negative electrode lead is preferably made of nickel or aluminum. The battery case may be made of an engineering plastic or the combination of an engineering plastic and a metal for achieving weigh reduction.

Insulating rings 7 are placed on the top and bottom of the electrode assembly 4. An electrolyte is then injected thereinto. Finally, the battery case is sealed using the sealing plate 2. The sealing plate may be equipped with a safety valve. Instead of a safety valve, it may be equipped with a conventionally known safety device. For instance, as an overcurrent-preventing device, fuse, bimetal or PTC device is used. Alternatively, instead of a safety valve, the following methods can be used as means of preventing an increase in the internal pressure of the battery: the making of a notch in the battery case, the cracking of the gasket, the cracking of the sealing plate or the cutting of the connection between the sealing plate and the lead plate. Alternatively, a protective circuit including means of preventing overcharge or overdischarge may be incorporated in a charger, or may be independently connected to the battery. As the method for welding the cap, the battery case, the sheet and the lead plate, any well-known method including AC or DC electric welding, laser welding or ultrasonic welding can be used. For the sealing agent for sealing, a conventional compound or mixture such as asphalt can be used.

While the present invention will be described below referring to the following representative examples, it is to be understood that the present invention is not limited to them.

EXAMPLE 1

Firstly, two different types of positive electrode active materials were prepared by the following procedure. $[Ni_{1/2}Co_{1/2}](OH)_2$ or $[Ni_{1/3}Mn_{1/3}Co_{1/3}](OH)_2$ obtained by coprecipitation was thoroughly mixed with $LiOH \cdot H_2O$, which was then formed into pellets and baked. $Li_{1\pm x}Ni_{1/2}Co_{1/2}O_2$ ($x \leq 0.1$) was obtained by baking at 900° C. $Li_{1\pm x}Ni_{1/3}Co_{1/3}Mn_{1/3}O_2$ ($x \leq 0.1$) was obtained by baking at 1000° C.

Subsequently, unit cells for electrochemical testing were produced using the positive electrode active materials prepared above in the following manner. A mixture containing 80 parts by weight of the above-obtained positive electrode active material $Li_{1\pm x}Ni_{1/2}Co_{1/2}O_2$ or $Li_{1\pm x}Ni_{1/3}Co_{1/3}Mn_{1/3}O_2$, 10 parts by weight of acetylene black as a conductive material and 10 parts by weight of PVdF (polyvinylidene fluoride) as a binder was diluted with NMP (N-methyl-2-pyrrolidone). The obtained mixture was applied onto a current collector made of aluminum foil, which was then dried in a vacuum at 60° C. for 30 minutes and cut into pieces of 15×20 mm². The piece was further dried in a vacuum at 150° C. for 14 hours to give an electrode. The electrode had a thickness of 120 to 190 μm.

The separator was a porous film made of polyethylene. The electrolyte was prepared by dissolving 1.0 M of $LiPF_6$ in a solvent mixture of EC (ethylene carbonate) and DMC (dimethyl carbonate) at a volume ratio of 3:7. Each of the obtained unit cells was repeatedly charged and discharged at a current density of 0.17 mA/cm² within a predetermined voltage.

Figure 14:
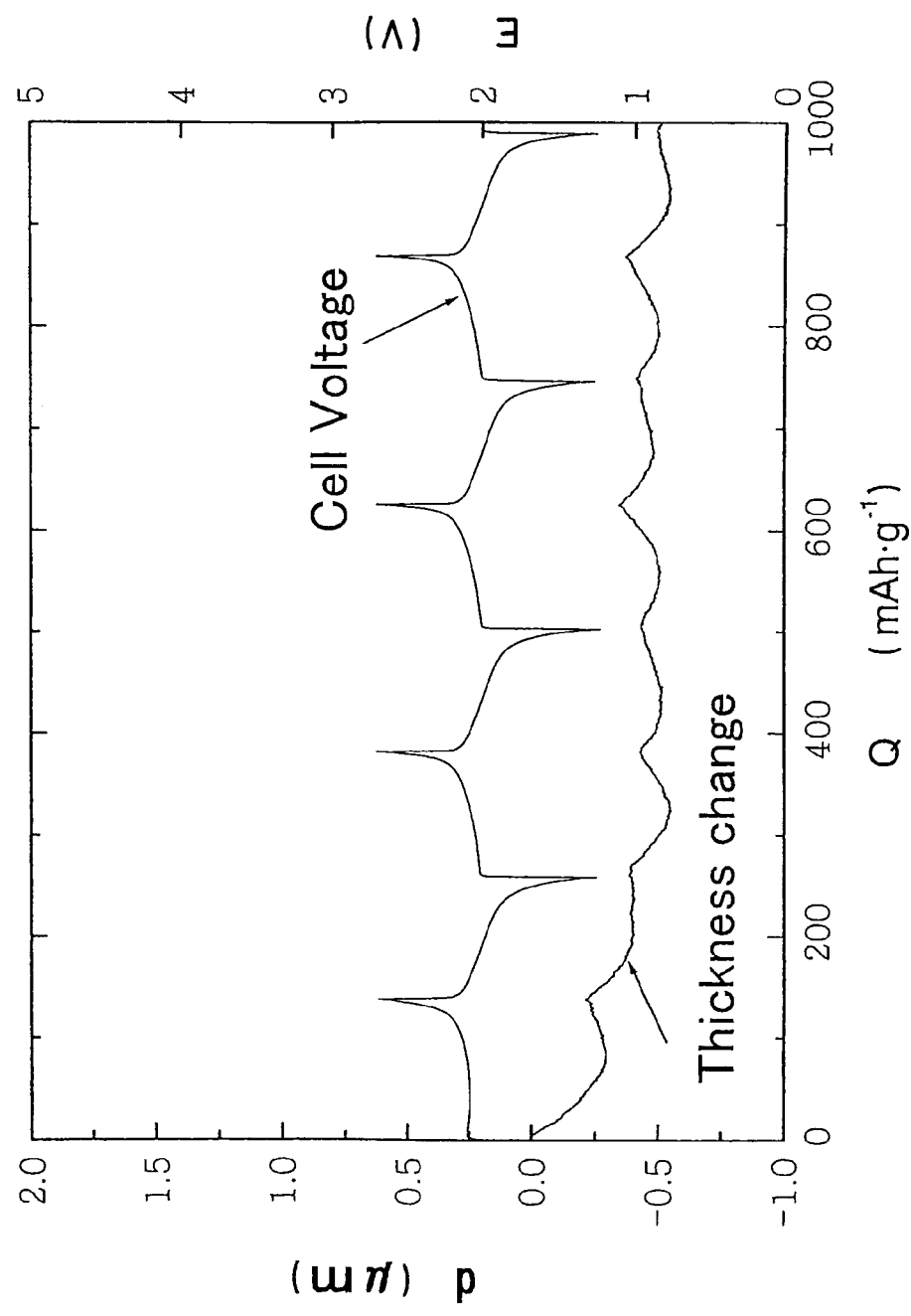
FIG. 14 is a graph showing the dilatometer measurement of $Li_{1\pm x}Ni_{1/2}Co_{1/2}O_2/Li_4Ti_5O_{12}$ battery.
Figure 15:
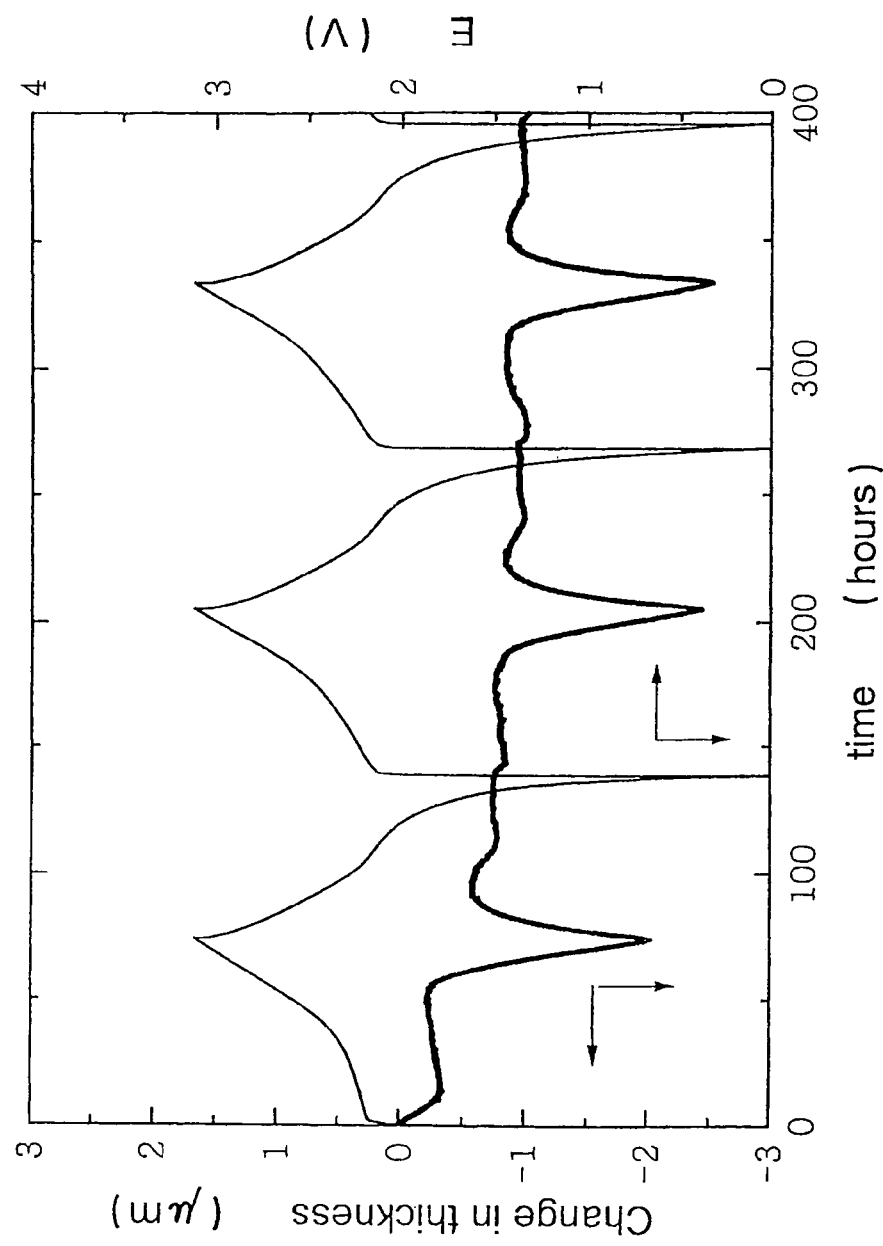
FIG. 15 is another graph showing the dilatometer measurement of $Li_{1\pm x}Ni_{1/2}Co_{1/2}O_2/Li_4Ti_5O_{12}$ battery.

FIG. 14 shows the measurement results of the total thickness of the positive and negative electrodes (total thickness of the electrodes) of the unit cell using $Li_{1\pm x}Ni_{1/2}Co_{1/2}O_2$ ($x \leq 0.3$) as the positive electrode active material and $Li_4Ti_5O_{12}$ as the negative electrode active material measured by a dilatometer having a gauge. It can be seen that the thickness changes in a wavelike manner, indicating that the measurement was performed with high precision. As evident from FIG. 14, the change of the total thickness of the electrodes was about 0.1 μm. Even if the initial change is taken into consideration, the change would be about 0.5 μm. Since the total thickness of the electrodes immediately after the production was about 300 μm, it can be said that the expansion and contraction of the electrodes was substantially zero. This has proved that a battery with no volume change is realized by combining the positive electrode with no volume change and the negative electrode as described above. A similar result of about 0.1 μm was obtained in the case of using $Li_{1\pm x}Ni_{1/3}Co_{1/3}Mn_{1/3}O_2$ ($x \leq 0.1$) in the positive electrode (see FIG. 15).

A similar measurement was performed using a negative electrode containing a carbonaceous material. An expansion of about 20% relative to the total thickness of the electrodes was observed at the initial stage after the production. During charge and discharge, an expansion and contraction of not less than 10% was observed. In the battery system according to the present invention, such extremely small expansion and contraction during charge and discharge is the factor for longer cycle life. Particularly, the cycle life when charged and discharged at a high rate is remarkably improved compared to that of a conventional battery system.

EXAMPLE 2

In this example, cylindrical batteries as shown in FIG. 16 were produced.

A battery case 1 was made of nickel-plated iron. A positive electrode lead 5 and a negative electrode lead 6 were made of aluminum and stainless steel, respectively.

The positive electrode (plate) was produced as follows. Firstly, 85 parts by weight of the powdered positive electrode active material $Li_{1\pm x}Ni_{1/2}Co_{1/2}O_2$ ($x \leq 0.1$) or $Li_{1\pm x}Ni_{1/3}Co_{1/3}Mn_{1/3}O_2$ ($x \leq 0.1$) was mixed with 10 parts by weight of carbonaceous powders as a conductive material and 5 parts by weight of polyvinylidene fluoride resin as a binder. The obtained mixture was dispersed in dehydrated N-methyl-pyrrolidinone to give a slurry. The slurry was applied onto a positive electrode current collector made of aluminum foil, which was then dried, rolled and cut into pieces of a predetermined size to give a positive electrode.

The negative electrode was produced in the same manner as the positive electrode was made except that $Li_4Ti_5O_{12}$ ($Li[Li_{1/3}Ti_{5/3}]O_4$) was used as the negative electrode active material instead of the positive electrode active material.

In the present invention, the separator used was a nonwoven fabric made of polypropylene. The organic electrolyte was prepared by dissolving $LiPF_6$ at a concentration of 1.0 mol/liter in a solvent mixture of ethylene carbonate (EC) and propylene carbonate (PC) at a volume ratio of 1:1. The produced cylindrical battery had a diameter of 14.1 mm and a height of 50.0 mm.

Each of the cylindrical batteries produced in the above manner was charged at a constant voltage of 2.5 V and discharged at a constant current of 100 mA to 1 V. The discharge capacity obtained at this time was 550 mAh. In this example, the batteries using the two different types of positive electrode active materials were designed to have almost the same battery capacity. When the batteries are charged for the second time or more, they were charged at a constant voltage of between 1.9 and 2.35 V. The charge capacities obtained at each voltage level are shown in Table 1.

TABLE 1

| | Charge voltage | | | | | | |
|---|---|---|---|---|---|---|---|
| | 1.9 V | 2.0 V | 2.1 V | 2.2 V | 2.25 V | 2.3 V | 2.35 V |
| Charge capacity when using $Li_{1\pm x}Ni_{1/2}Co_{1/2}O_2$ [mAh] | 7.3 | 91.7 | 271 | 396 | 422 | 458 | 477 |
| Charge capacity when using $Li_{1\pm x}Ni_{1/2}Co_{1/3}Mn_{1/3}O_2$ [mAh] | 238 | 367 | 403 | 440 | 458 | 477 | 495 |

It is evident from Table 1 that, in the battery using $Li_{1\pm x}Ni_{1/2}Co_{1/2}O_2$, the rate of increase of the capacity relative to the voltage increase was small in the range of 2.2 V or more. In the battery using $Li_{1\pm x}Ni_{1/3}Co_{1/3}Mn_{1/3}O_2$, the rate of increase of the capacity relative to the voltage increase was small in the range of 2.0 V or more. This indicates that the precision of voltage control relative to the capacity was increased in that voltage range.

EXAMPLE 3

This example examined the preferred capacity design of the positive and negative electrodes in the present invention. Cylindrical batteries were produced in the same manner as in EXAMPLE 2 using different weight ratios between the positive electrode active material per unit area of the positive electrode plate and the negative electrode active material per unit area of the negative electrode plate. The cycle life of each of the produced cylindrical batteries was measured. The results are shown in Table 2. In the charge and discharge cycles, charging was performed at a constant voltage of 5 V with a maximum current of 1 C. The charging was stopped two hours after the start of charging. Discharging was performed, on the other hand, at a constant current of 2 C to 1.0 V. Table 2 shows the number of cycles when the discharge capacity decreased to 98% of the initial capacity.

TABLE 2

| Weight ratio of negative electrode active material to positive electrode active material | Number of cycles at a capacity ratio of 98% |
|---|---|
| 0.3 | 282 |
| 0.5 | 305 |
| 0.8 | 308 |
| 1.0 | 300 |
| 1.2 | 293 |
| 1.5 | 258 |

It is evident from Table 2 that the cycle life decreased when the weight ratio was 1.2 or more. Accordingly, The battery is preferably designed such that a negative electrode is substantially regulated (the capacity of the negative electrode is regulated). If the capacity of the positive electrode is increased more than necessary, the battery capacity will decrease. For this reason, preferred weight ratio is substantially 0.5 to 1.2.

EXAMPLE 4

This example examined the preferred current collectors for the positive and negative electrodes.

Cylindrical batteries were produced in the same manner as in EXAMPLE 2 except that the current collectors for the positive and negative electrodes were made of the materials shown in Table 3. Each of the produced batteries was subjected to overcharge testing. Table 3 shows the battery surface temperature of each cylindrical battery during the overcharge testing. The highest battery temperature during the overcharge testing was referred to as "battery surface temperature". The overcharge was performed at a constant current of 1.5 C.

TABLE 3

| Material for current collector | Battery surface temperature |
|---|---|
| Copper | 85° C. |
| Aluminum | 48° C. |

It is evident from Table 3 that the use of the current collector made of aluminum suppressed the generation of heat in the battery during overcharging. This proves that it is possible to produce a 2 V battery that is light and inexpensive yet provides a high level of safety by using a current collector made of aluminum in the battery system of the present invention.

EXAMPLE 5

This example examined the preferred electrolyte.

Cylindrical batteries were produced in the same manner as in EXAMPLE 2 except that the combinations of solvents and solutes listed in Table 4 were used. The capacity of the batteries with different electrolytes is expressed by an index relative to the capacity of the battery with a conventional electrolyte to which index 100 corresponds. The results are shown in Table 4. For comparison, cylindrical batteries were produced in the same manner using a lithium cobaltate as the positive electrode active material and a graphite material as the negative electrode active material, followed by evaluation. The indication "EC/DEC (3/7)" means that the solvent was a solvent mixture of EC and DEC at a weight ratio of 3:7. The capacities of the batteries containing this electrolyte were set to 100.

TABLE 4

| Composition of solvent | Solute | Battery of the invention | Battery using $LiCoO_2$/graphite |
|---|---|---|---|
| EC/DEC (3/7) | 1M $LiPF_6$ | 100 | 100 |
| GBL | 1M $LiBF_4$ | 102 | 10 |
| GVL | 1M $LiBF_4$ | 101 | 12 |
| PC | 1M $LiPF_6$ | 102 | 2 |
| Methyldiglime | 1M $LiPF_6$ | 100 | 20 |
| Methoxy EMC | 1M $LiPF_6$ | 100 | 87 |
| Trimethyl phosphate | 1M $LiPF_6$ | 98 | 18 |
| Triethyl phosphate | 1M $LiPF_6$ | 97 | 20 |
| Sulpholane | 1M $LiPF_6$ | 87 | 30 |
| PC/DEC (1/1) | 1M $LiPF_6$ | 100 | 13 |
| PC/EMC (1/1) | 1M $LiPF_6$ | 100 | 12 |
| GBL/PC (1/1) | 1M $LiPF_6$ | 101 | 8 |
| EC/PC (1/1) | 1M $LiPF_6$ | 102 | 15 |
| EC/GBL (1/1) | 1M $LiBF_4$ | 102 | 75 |
| F-EC/DEC (3/7) | 1M $LiPF_6$ | 101 | 20 |
| F-EC/PC (1/1) | 1M $LiPF_6$ | 101 | 30 |
| F-EC/GBL (1/1) | 1M $LiBF_4$ | 101 | 25 |

It is clear from Table 4 that the conventional batteries using graphite failed to provide satisfactory capacities whereas the batteries of the present invention can use electrolytes unable to be used without any trouble. Accordingly, the present invention can provide a low cost battery capable of providing a high level of safety. Combinations of solvent mixtures of these solvents and conventional solvents may also be used.

EXAMPLE 6

This example produced cylindrical batteries in the same manner as in EXAMPLE 2 except that the solvents and solutes listed in Table 5 were used, and evaluations were made. Detailed examinations were made using an ionic liquid (A) consisting of trimethylpropylammonium cation (TMPA) and trifluoromethylsulfonyl imide anion (TFSI) or an ionic liquid (B) consisting of 1-ethyl-3-methyl imidazolium cation and trifluoromethyl imide anion. Batteries using different mixtures of the ionic liquids and the conventional non-aqueous electrolytes containing ethylene carbonate and the like were also subjected to the same evaluation tests to verify the operativeness and the superiority. At the same time, in order to verify the effect of the ionic liquid on safety, a hot-box test was performed using a fully-charged 2.5 V cylindrical battery. A hot box with the fully-charged battery placed therein was heated from 30 to 150° C. at a rate of 5° C./min and held at 150° C. for 3 hours. The battery surface temperature at this time was measured. Table 5 shows the electrical characteristics and the results of the hot box test.

TABLE 5

| Composition of solvent | Solute | Battery of the invention | Battery using LiCoO$_2$/ graphite | Surface temperature |
|---|---|---|---|---|
| EC/DEC (3/7) | 1M LiPF$_6$ | 100 | 100 | 165° C. |
| Ionic liquid A | 0.75M TFSI | 100 | 1 | 151° C. |
| Ionic liquid B | 0.75M TFSI | 102 | 1 | 151° C. |
| EC/Ionic liquid A (2/1) | 1M LiPF$_6$ | 101 | 55 | 155° C. |
| EC/Ionic liquid B (2/1) | 1M LiPF$_6$ | 102 | 35 | 158° C. |
| EC/Ionic liquid A/ DEC (2/1/1) | 1M LiPF$_6$ | 100 | 40 | 159° C. |
| EC/Ionic liquid B/ DEC (2/1/1) | 1M LiPF$_6$ | 100 | 35 | 160° C. |

It is apparent from Table 5 that the ionic liquids unable to be used in conventional batteries can be used singly. It is also apparent that the use of the ionic liquids greatly improves safety because an abnormal temperature increase in the hot box test was not observed almost at all. Many ionic liquids are exemplified in FIGS. 11 to 13. Although the problem of viscosity still exists, the combinations of the ionic liquid with a conventional solvent, particularly with EC, increase the possibility of use of the ionic liquids, and the effect of the improvement in safety and reliability can be expected.

EXAMPLE 7

This example examined the preferred separator.

Cylindrical batteries were produced in the same manner as in EXAMPLE 2 except that separators (thickness: 25 μm) made of materials listed in Table 6 were used, and then evaluated. The pulse discharge characteristics and the maximum value of battery surface temperature during overcharge are also shown in Table 6. The pulse discharge test was performed using a current of 1 A and a simple pulse of 5 seconds on and 5 seconds off. The pulse discharge time of the batteries using separators made of materials other than a conventional PE porous film is expressed by an index relative to the pulse discharge time of the battery using the PE porous film to which index 100 corresponds. The overcharge was performed at a constant current of 1.5 C.

TABLE 6

| Separator material | Pulse time index | Battery surface temperature |
|---|---|---|
| Polyethylene porous film | 100 | 45 |
| Polyethylene non-woven fabric | 177 | 47 |
| Polypropylene non-woven fabric | 185 | 48 |
| Polybutylene terephthalate non-woven fabric | 182 | 52 |

It is evident from Table 6 that the pulse discharge time is greatly improved while the safety during overcharge is kept constant by using the non-woven fabric in the battery systems of the present invention. It is also evident that the use of the non-woven fabric improves the drop in voltage due to the pulse current.

As described above, in the battery system of the present invention, it is possible to suppress the cycle life degradation due to expansion and contraction of the electrode, which has been an acknowledged problem, and to greatly improve the high rate discharge characteristics, the pulse characteristics and the charge control. Accordingly, the characteristics of the non-aqueous electrolyte secondary battery in accordance with the present invention can be fully utilized in power sources for hybrid automobiles and power tools that require the ability to charge and discharge at a high rate and a longer cycle life, as well as in large batteries for driving systems such as power sources for electric vehicles. The non-aqueous electrolyte secondary battery in accordance with the present invention can also be used, instead of as an alternative to lead-acid batteries, as the battery for portable devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery including:
    a negative electrode comprising a titanium oxide as a negative electrode active material; and
    a positive electrode comprising a positive electrode active material having a layered structure and being represented by the chemical formula $Li_{1\pm\alpha}[Me]O_2$, where $0 \leq \alpha < 0.2$, and Me is a transition metal including Ni and at least one selected from the group consisting of Mn, Fe, Co, Ti and Cu,
    said battery having a designed charge/discharge range of not greater than 2.8 V,
    wherein said positive electrode active material comprises crystalline primary particles having an average particle size of 0.1 to 8 μm and secondary particles having an average particle size of 2 to 30 μm made of said crystalline primary particles.

2. The non-aqueous electrolyte secondary battery in accordance with claim 1, wherein the volume expansion/contraction ratio calculated from the crystal lattice constants of said positive electrode active material and said negative electrode active material in the designed charge/discharge range is not greater than 2%.

3. The non-aqueous electrolyte secondary battery in accordance with claim 2, wherein said positive electrode active material comprises elemental nickel and elemental cobalt in substantially the same ratio.

4. The non-aqueous electrolyte secondary battery in accordance with claim 3, wherein said positive electrode active material comprises at least one of $Li_{1\pm x}Ni_{1/2}Co_{1/2}O_2$ ($x\leqq 0.1$) and $Li_{1\pm x}Ni_{1/3}Co_{1/3}Mn_{1/3}O_2$ ($x\leqq 0.1$).

5. The non-aqueous electrolyte secondary battery in accordance with claim 3, wherein the error of the ratio between said elemental nickel and said elemental cobalt is within 10 atom %.

6. The non-aqueous electrolyte secondary battery in accordance with of claim 1, wherein said positive electrode active material comprises, as an additional element, at least one selected from the group consisting of Al, Mg, Sr, Ca, Y and Yb.

7. The non-aqueous electrolyte secondary battery in accordance with claim 1, wherein said titanium oxide has a spinel structure.

8. The non-aqueous electrolyte secondary battery in accordance with claim 1, wherein said titanium oxide is $Li_4Ti_5O_{12}$.

9. The non-aqueous electrolyte secondary battery in accordance with claim 1, further comprising at least one selected from the group consisting of ethylene carbonate, propylene carbonate, γ-butyrolactone, γ-valerolactone, methyldiglyme, sulfolane, trimethyl phosphate, triethyl phosphate, methoxy ethyl methyl carbonate and fluorinated ethylene carbonate.

10. The non-aqueous electrolyte secondary battery in accordance with claim 1, further comprising at least one ionic liquid.

11. The non-aqueous electrolyte secondary battery in accordance with claim 10, wherein the cation in said ionic liquid is selected from the group consisting of imidazolium, pyridinium, phosphonium, ammonium, pyrrolidinium, guanidinium and isouronium.

12. The non-aqueous electrolyte secondary battery in accordance with claim 10, wherein the anion in said ionic liquid is selected from the group consisting of halogen, sulfate, sulfonate, amide, imide, methane, borate, phosphate, antimonate, decanate and cobalt tetracarbonyl.

13. The non-aqueous electrolyte secondary battery in accordance with claim 1, further comprising a separator made of non-woven fabric.

14. The non-aqueous electrolyte secondary battery in accordance with claim 13, wherein said separator is made of at least one selected from the group consisting of polyethylene, polypropylene, vinylon, nylon, polyethylene terephthalate, aramid resin and polybutylene terephthalate.

15. The non-aqueous electrolyte secondary battery in accordance with claim 1, wherein the weight ratio of said negative electrode active material to said positive electrode active material is not less than 0.5 and less than 1.2.

16. The non-aqueous electrolyte secondary battery in accordance with claim 1, wherein each of said positive electrode and said negative electrode includes a current collector made of aluminum or an aluminum alloy.

17. The non-aqueous electrolyte secondary battery in accordance with claim 1, wherein said negative electrode active material comprises secondary particles having an average particle size of not greater than 10 μm,
   said secondary particles comprising aggregated primary particles having an average particle size of not greater than 0.6 μm.

18. A non-aqueous electrolyte secondary battery including:
   a negative electrode comprising a titanium oxide as a negative electrode active material; and
   a positive electrode comprising a positive electrode active material having a layered structure and being represented by the chemical formula $Li_{1\pm\alpha}[Me]O_2$, where $0\leqq\alpha<0.2$, and Me is a transition metal including Ni and at least one selected from the group consisting of Mn, Fe, Co, Ti, and Cu,
   said battery having designed charge/discharge range of not greater than 2.8 V,
   wherein said positive electrode active material comprises at least one of $Li_{1\pm x}Ni_{1/2}Co_{1/2}O_2$ ($x\leqq 0.1$) and $Li_{1\pm x}Ni_{1/3}Co_{1/3}Mn_{1/3}O_2$ ($x\leqq 0.1$), and said titanium oxide has a spinel structure.

19. The non-aqueous electrolyte secondary battery in accordance with claim 18, wherein the volume expansion/contraction ratio calculated from the crystal lattice constants of said positive electrode active material and said negative electrode active material in the designed charge/discharge range is not greater than 2%.

20. The non-aqueous electrolyte secondary battery in accordance with claim 18, wherein said titanium oxide is $Li_4Ti_5O_{12}$.

21. The non-aqueous electrolyte secondary battery in accordance with claim 18, further comprising at least one selected from the group consisting of ethylene carbonate, propylene carbonate, γ-butyrolactone, γ-valerolactone, methyldiglyme, sulfolane, trimethyl phosphate, triethyl phosphate, methoxy ethyl methyl carbonate and fluorinated ethylene carbonate.

22. The non-aqueous electrolyte secondary battery in accordance with claim 18, further comprising at least one ionic liquid.

23. The non-aqueous electrolyte secondary battery in accordance with claim 22, wherein the cation in said ionic liquid is selected from the group consisting of imidazolium, pyridinium, phosphonium, ammonium, pryrrolidinium, guanidinium and isouronium.

24. The non-aqueous electrolyte secondary battery in accordance with claim 22, wherein the anion in said ionic liquid is selected from the group consisting of halogen, sulfate, sulfonate, amide, imide, methane, borate, phosphate, antimonate, decanate and cobalt tetracarbonyl.

25. The non-aqueous electrolyte secondary battery in accordance with claim 18, further comprising a separator made of non-woven fabric.

26. The non-aqueous electrolyte secondary battery in accordance with claim 25, wherein said separator is made of at least one selected from the group consisting of polyethylene, polypropylene, vinylon, nylon, polyethylene terephthalate, aramid resin and polybutylene terephthalate.

27. The non-aqueous electrolyte secondary battery in accordance with claim 18, wherein the weight ratio of said negative electrode active material to said positive electrode active material is not less than 0.5 and less than 1.2.

28. The non-aqueous electrolyte secondary battery in accordance with claim 18, wherein each of said positive electrode and said negative electrode includes a current collector made of aluminum or an aluminum alloy.

29. The non-aqueous electrolyte secondary battery in accordance with claim 18, wherein said positive electrode active material comprises crystalline primary particles having an average particle size of 0.1 to 8 μm and secondary particles having an average article size of 2 to 30 μm made of said crystalline primary particles.

30. The non-aqueous electrolyte secondary battery in accordance with claim 18, wherein said negative electrode active material comprises secondary particles having an average particle size of not greater than 10 μm,
   said secondary particles comprising aggregated primary particles having an average particle size of not greater than 0.6 μm.

31. The non-aqueous electrolyte secondary battery in accordance with claim 1, further comprising at least one ionic liquid comprising at least one of $LiPF_6$ and $LiBF_4$.

32. The non-aqueous electrolyte secondary battery in accordance with claim 1, wherein the weight ratio of said negative electrode active material to said positive electrode active material is not less than 0.5 and not more than 1.0.

* * * * *

UNITED STATES PATENT AND TRADEMARK OFFICE
CERTIFICATE OF CORRECTION

PATENT NO. : 7,722,989 B2
APPLICATION NO. : 10/979764
DATED : May 25, 2010
INVENTOR(S) : Tsutomu Ohzuku et al.

It is certified that error appears in the above-identified patent and that said Letters Patent is hereby corrected as shown below:

Fig. 4, – please correct Li/ Li [$Ni_{1/3}Mn_{1/3}Mn_{1/3}$] $O_2$ to Li/ Li [$Ni_{1/3}Mn_{1/3}Co_{1/3}$]$O_2$ Fig. 9, – please correct Li/ Li [$Ni_{1/3}Mn_{1/3}Mn_{1/3}$] $O_2$ to Li/ Li [$Ni_{1/3}Mn_{1/3}Co_{1/3}$]$O_2$ Column 1, line 35, please correct $LiCOO_2$ to $LiC_oO_2$ Column 18, table 1, last line, please correct $Ni_{1/2}$ to $Ni_{1/3}$ Signed and Sealed this
Twenty-seventh Day of December, 2011

David J. Kappos
*Director of the United States Patent and Trademark Office*

UNITED STATES PATENT AND TRADEMARK OFFICE
CERTIFICATE OF CORRECTION

PATENT NO. : 7,722,989 B2  Page 1 of 1
APPLICATION NO. : 10/979764
DATED : May 25, 2010
INVENTOR(S) : Tsutomu Ohzuku et al.

It is certified that error appears in the above-identified patent and that said Letters Patent is hereby corrected as shown below:

At Column 6, line 48, please correct $Co_{1/2}$ to $Co_{1/3}$ and Column 6, line 52, please correct $Co_{1/2}$ to $Co_{1/3}$ Signed and Sealed this
Twenty-second Day of January, 2013

David J. Kappos
*Director of the United States Patent and Trademark Office*